(12) United States Patent
Toriumi et al.

(10) Patent No.: US 10,665,445 B2
(45) Date of Patent: May 26, 2020

(54) SAMPLE MOUNTING PLATE AND METHOD FOR MANUFACTURING THE SAME

(71) Applicants: CITIZEN FINEDEVICE CO., LTD., Minamitsuru-gun, Yamanashi (JP); CITIZEN WATCH CO., LTD., Nishitokyo-shi, Tokyo (JP)

(72) Inventors: Kazuhiro Toriumi, Minamitsuru-gun (JP); Mitsunori Miyamoto, Minamitsuru-gun (JP); Satoru Fukumoto, Minamitsuru-gun (JP)

(73) Assignees: CITIZEN FINEDEVICE CO., LTD., Minamitsuru-gun (JP); CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 16/132,650

(22) Filed: Sep. 17, 2018

(65) Prior Publication Data
US 2019/0027352 A1    Jan. 24, 2019

Related U.S. Application Data

(63) Continuation of application No. PCT/JP2017/011065, filed on Mar. 17, 2017.

(30) Foreign Application Priority Data

Mar. 18, 2016  (JP) .................................. 2016-055795
Mar. 31, 2016  (JP) .................................. 2016-073367

(51) Int. Cl.
*H01J 49/04*  (2006.01)
*B01L 3/00*  (2006.01)
*H01J 49/16*  (2006.01)

(52) U.S. Cl.
CPC ........ *H01J 49/0418* (2013.01); *B01L 3/5085* (2013.01); *B01J 2219/00527* (2013.01);
(Continued)

(58) Field of Classification Search
CPC .... H01J 49/0418; B01L 3/5085; G01N 27/62; B01J 2219/00527; B01J 2219/00619;
(Continued)

(56) References Cited

U.S. PATENT DOCUMENTS

2002/0110847 A1*  8/2002  Baumann ............... C12M 35/02
                                                                435/29
2004/0217276 A1    11/2004  DiCesare
(Continued)

FOREIGN PATENT DOCUMENTS

EP    1 284 495 A2    2/2003
EP    1 284 495 A3    12/2005
(Continued)

OTHER PUBLICATIONS

International Preliminary Report on Patentability dated Sep. 18, 2018, issued in counterpart International Application No. PCT/JP2017/011065. (5 pages).
(Continued)

*Primary Examiner* — Nicole M Ippolito
(74) *Attorney, Agent, or Firm* — Westerman, Hattori, Daniels & Adrian, LLP

(57) ABSTRACT

A sample loading plate that includes at least one sample mounting spot that mount a sample thereon is provided with a substrate having a conductive surface and an insulating film that is laminated on the conductive surface of the substrate and that has at least an insulating surface, the insulating film being sparsely formed so that the conductive surface of the substrate is partially exposed at least in the sample mounting spot. Thus, a voltage applied to the sample loading plate can effectively place the sample in an electric field. As a result of which, in a mass spectrometric analysis of the sample, there is no charge up of the sample and appropriate ionization becomes possible.

17 Claims, 13 Drawing Sheets

(52) U.S. Cl.
CPC ............... *B01J 2219/00612* (2013.01); *B01J 2219/00619* (2013.01); *B01J 2219/00653* (2013.01); *B01J 2219/00659* (2013.01); *H01J 49/164* (2013.01)

(58) Field of Classification Search
CPC .... B01J 2219/00612; B01J 2219/00653; B01J 2219/00659
USPC ................ 250/440.11, 441.11, 442.11, 443.1
See application file for complete search history.

(56) References Cited

U.S. PATENT DOCUMENTS

| | | |
|---|---|---|
| 2004/0217278 A1 | 11/2004 | Overney et al. |
| 2005/0139779 A1 | 6/2005 | Overney et al. |
| 2007/0202538 A1 | 8/2007 | Glezer et al. |
| 2014/0084902 A1* | 3/2014 | Baikie .................. B82Y 35/00 324/97 |
| 2015/0155152 A1 | 6/2015 | Yamazoe et al. |
| 2016/0027631 A1 | 1/2016 | Naya et al. |
| 2016/0141166 A1* | 5/2016 | Toriumi .............. H01J 49/0418 250/288 |

FOREIGN PATENT DOCUMENTS

| | | |
|---|---|---|
| JP | 2006-525525 A | 11/2006 |
| JP | 2012-230801 A | 11/2012 |
| JP | 2014-202650 A | 10/2014 |
| JP | 2015-232568 A | 12/2015 |
| JP | 2016-121968 A | 7/2016 |
| WO | 2014/167828 A1 | 10/2014 |
| WO | 2015/019861 A1 | 2/2015 |

OTHER PUBLICATIONS

English translation of International Search Report dated Jun. 20, 2017, issued in counterpart International Application No. PCT/JP2017/011065 (1 page).

Extended European Search Report dated Oct. 10, 2019, issued in counterpart EP Application No. 17766874.6. (11 pages).

* cited by examiner

{Fig. 1A}
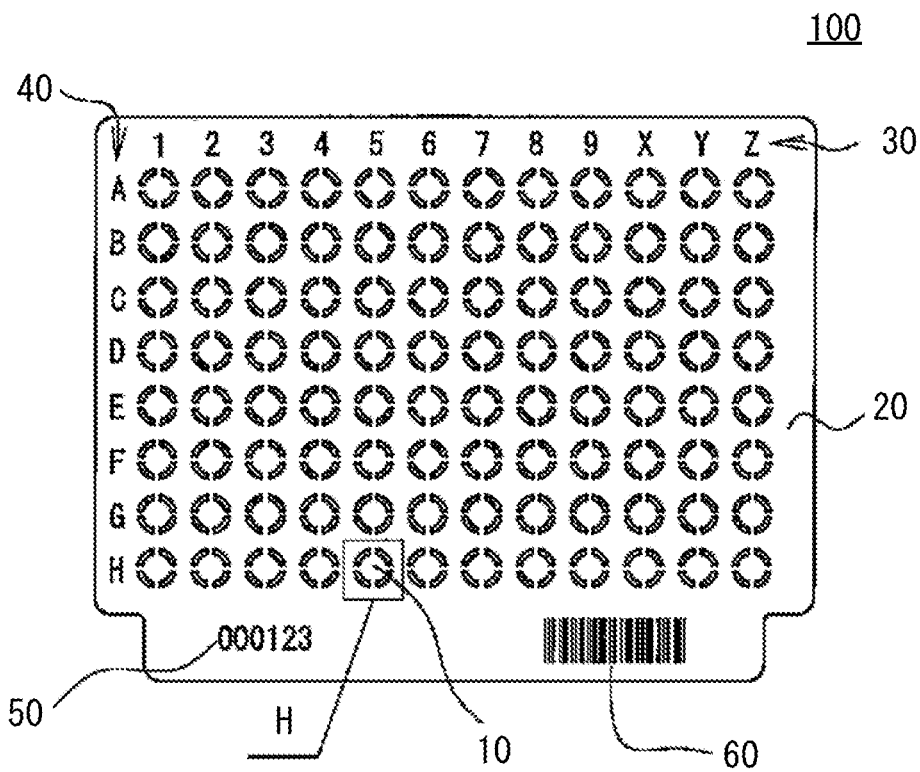
{Fig. 1B}
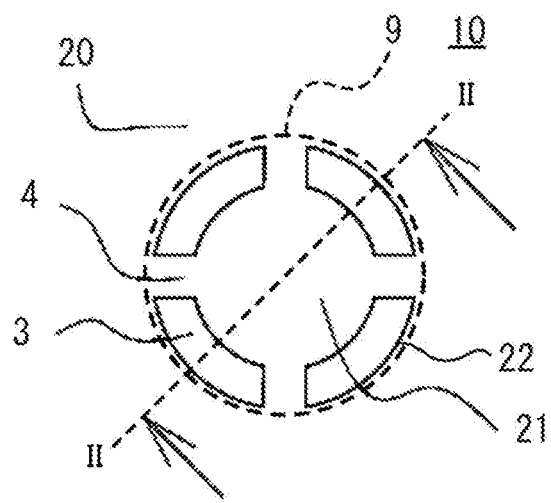

{Fig. 2}
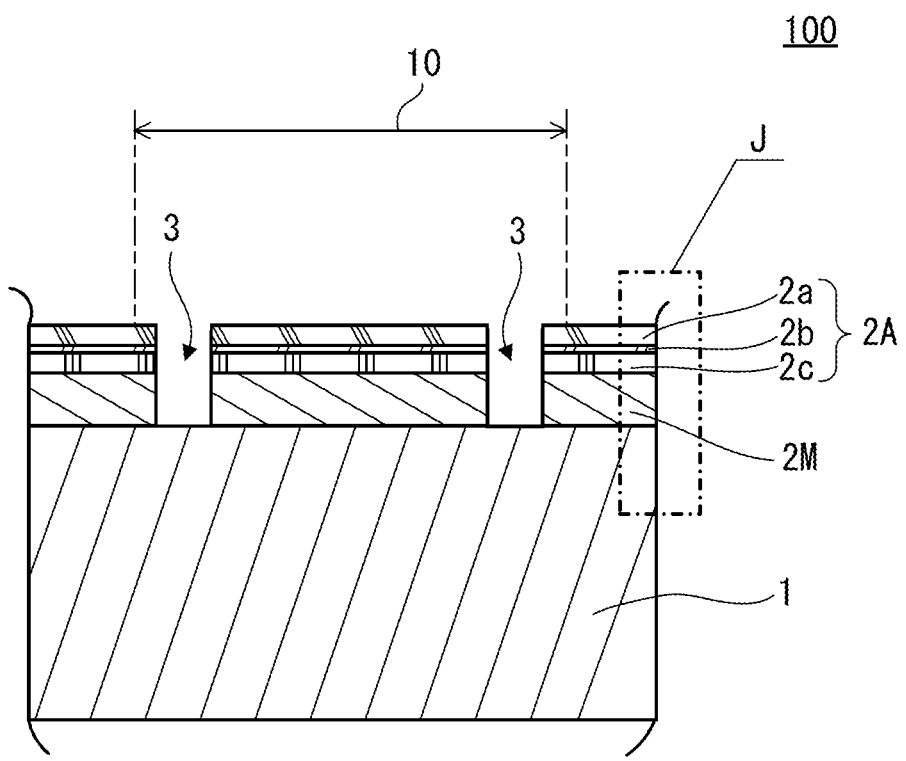

{Fig. 3A}

| NAME | REFERENCE SIGN | | MATERIAL | THICKNESS (nm) |
|---|---|---|---|---|
| OPTICAL MULTILAYER FILM | 2A | 2a | SiO$_2$ | 90 |
| | | 2b | Ti | 10 |
| | | 2c | Al$_2$O$_3$ | 80 |
| FIRST METAL FILM | 2M | | Ni | 300 |
| SUBSTRATE | 1 | | Al$_2$O$_3$ | --- |

{Fig. 3B}

| NAME | REFERENCE SIGN | | MATERIAL | THICKNESS (nm) |
|---|---|---|---|---|
| OPTICAL MULTILAYER FILM | 2A | 2a | SiO$_2$ | 60 |
| | | 2b | TiO$_2$ | 30 |
| | | 2c | Al$_2$O$_3$ | 60 |
| FIRST METAL FILM | 2M | | Al | 300 |
| SUBSTRATE | 1 | | Al$_2$O$_3$ | --- |

{Fig. 4}
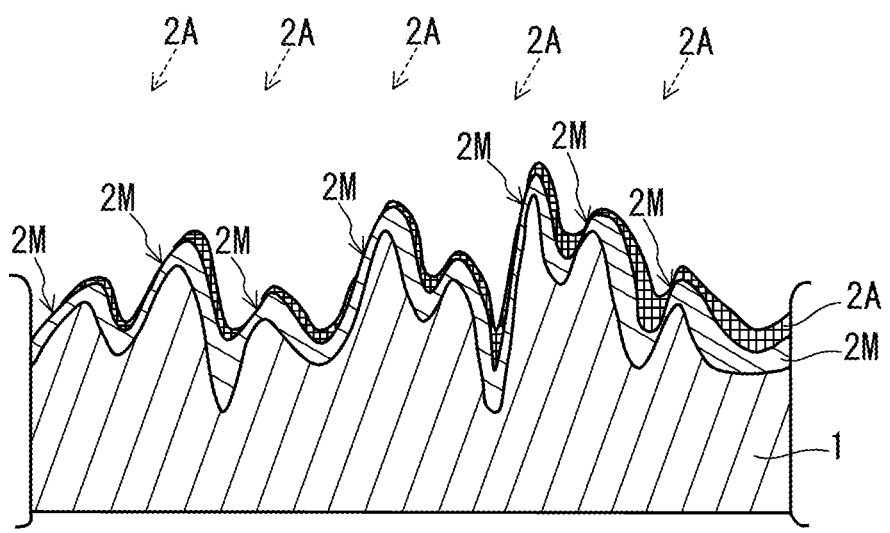

{Fig. 5A}
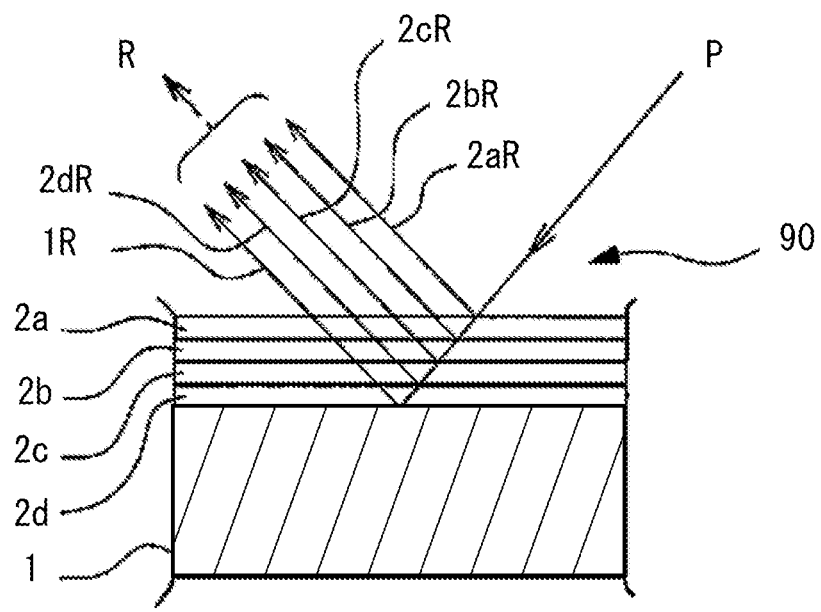
{Fig. 5B}
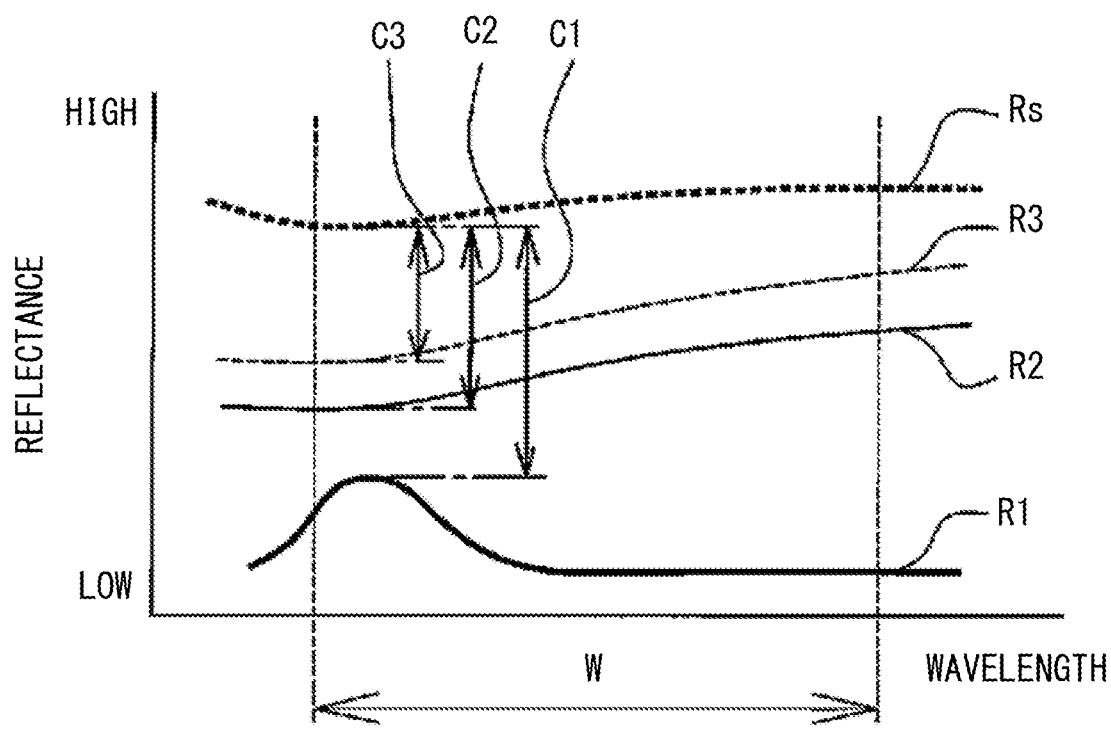

{Fig. 6A}
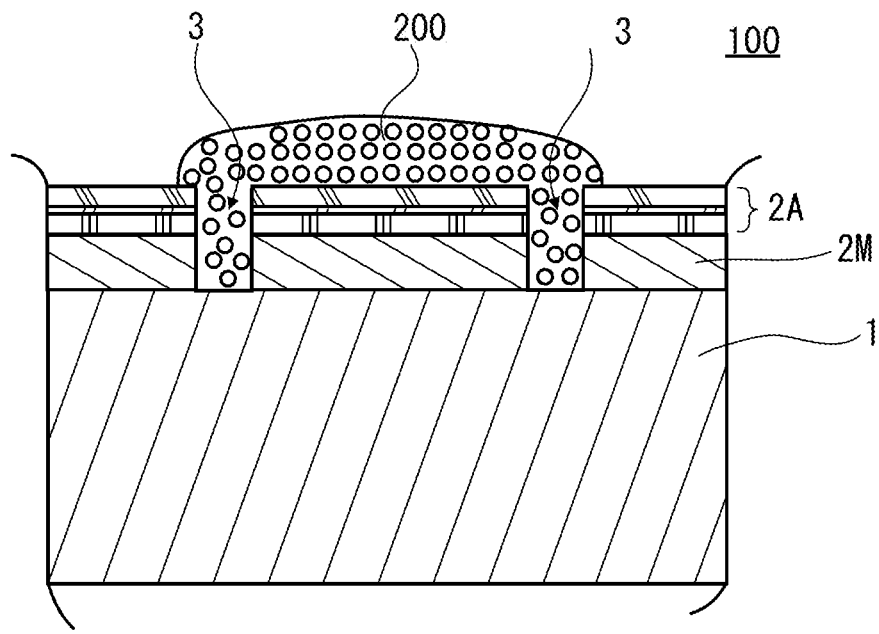
{Fig. 6B}
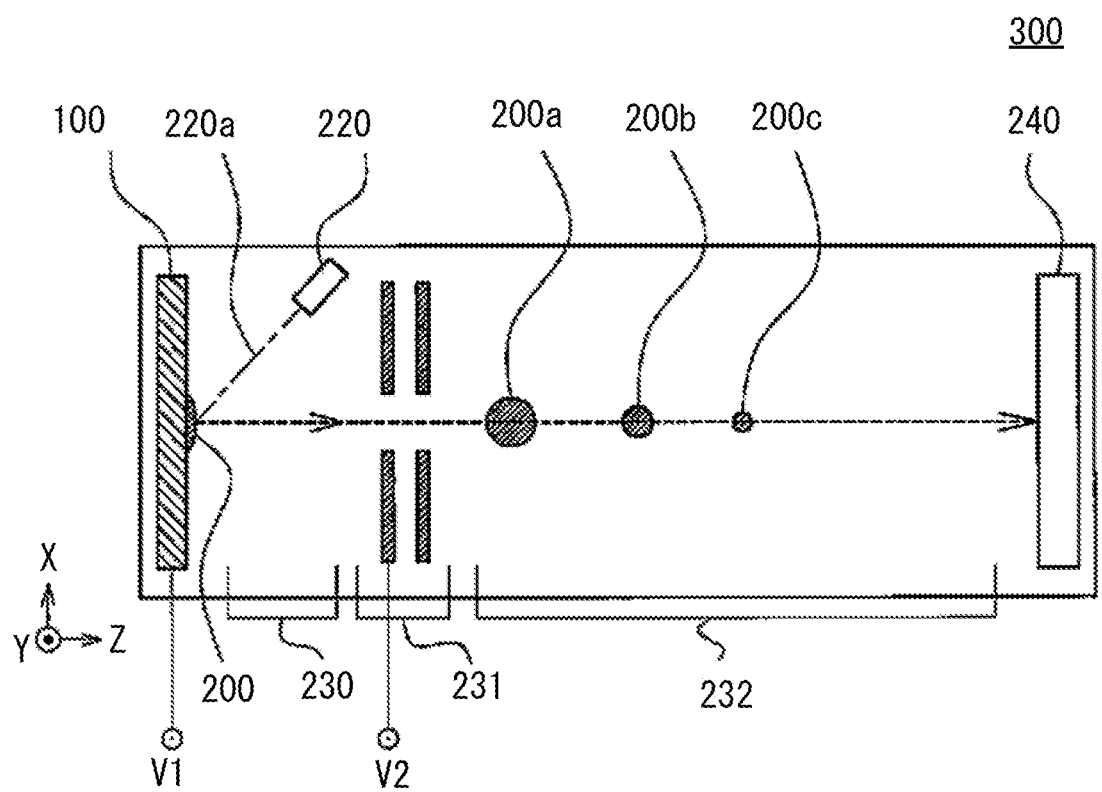

{Fig. 7}
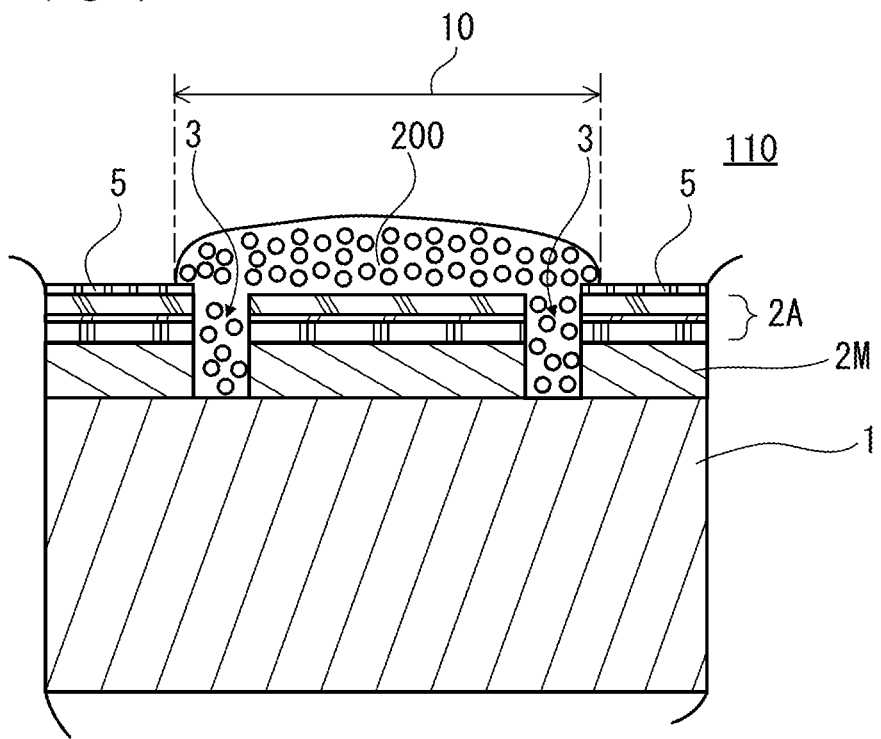
{Fig. 8}
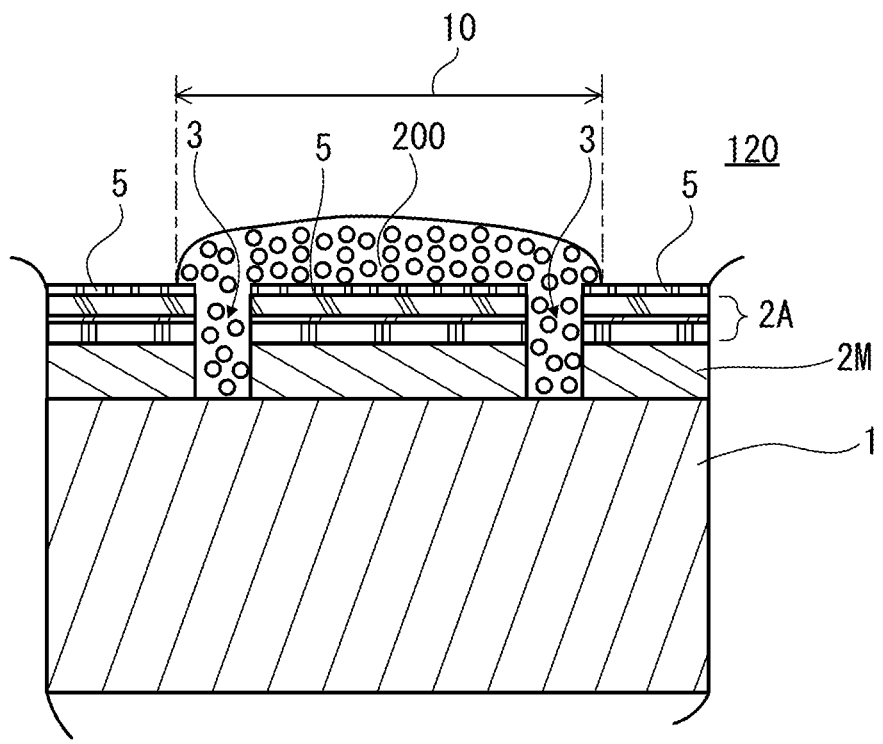

{Fig. 9}
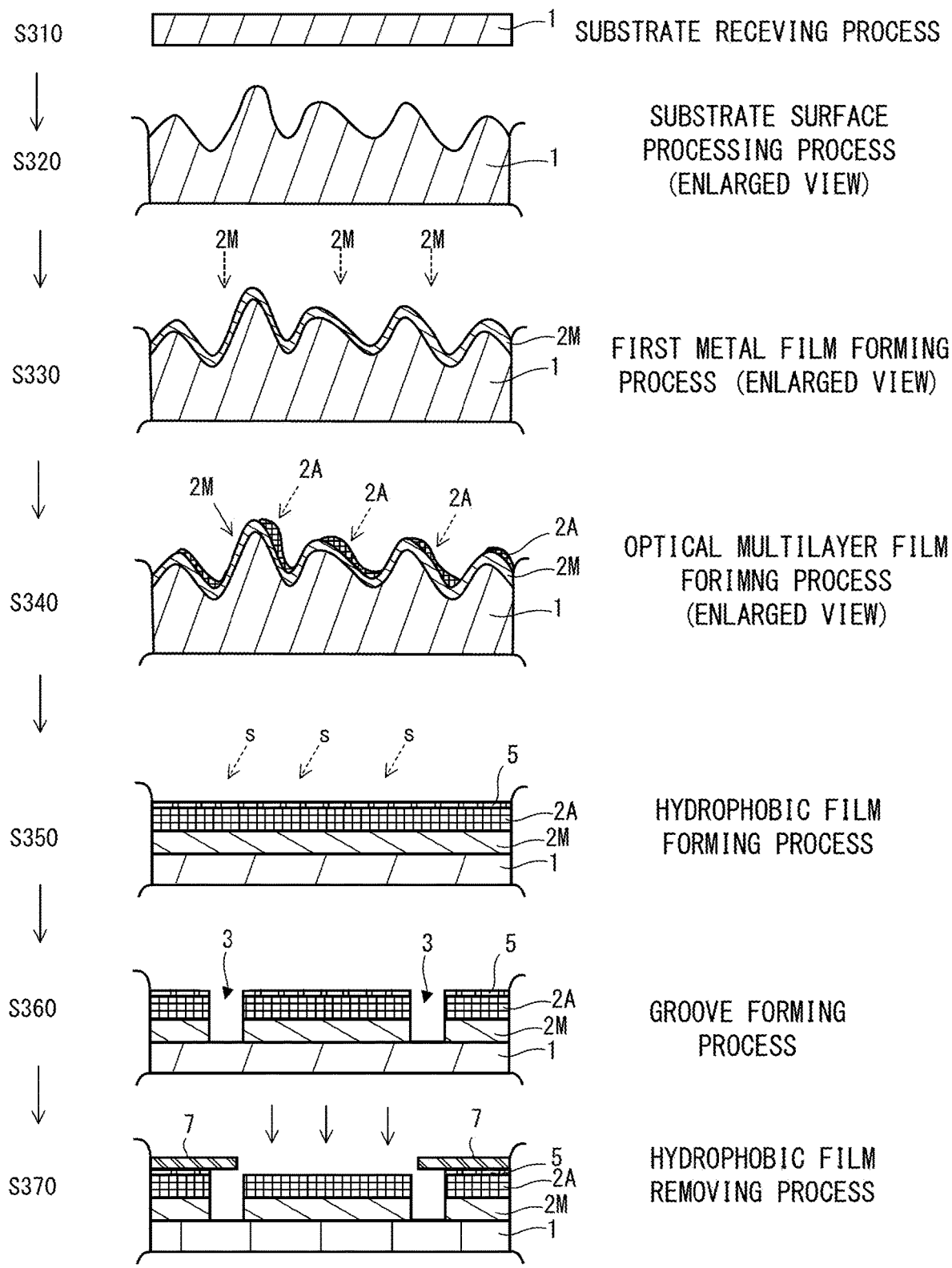

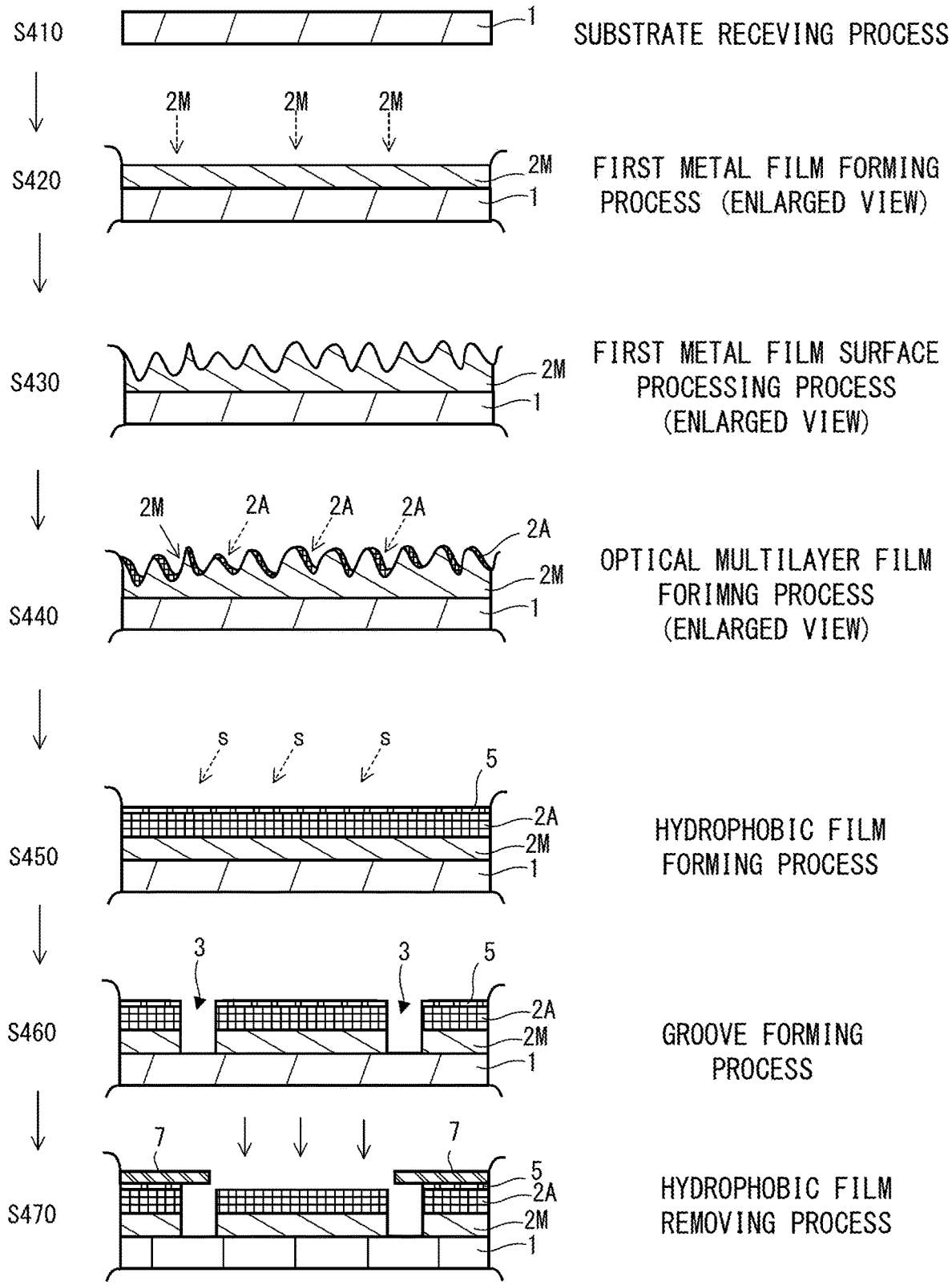

{Fig. 11}
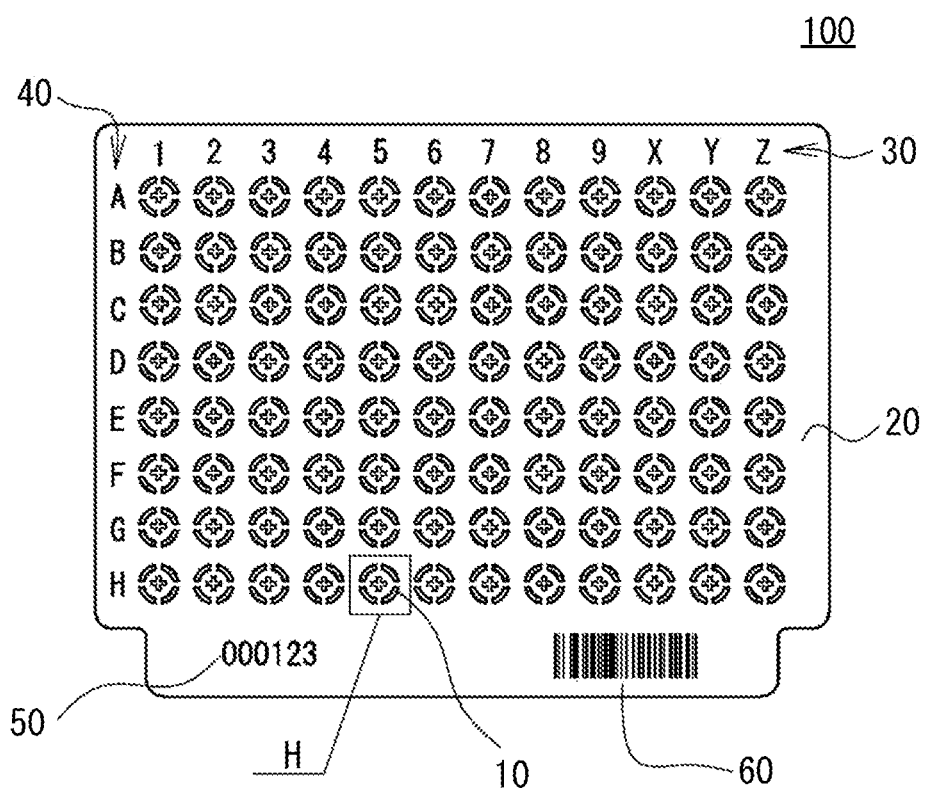

{Fig. 12A}
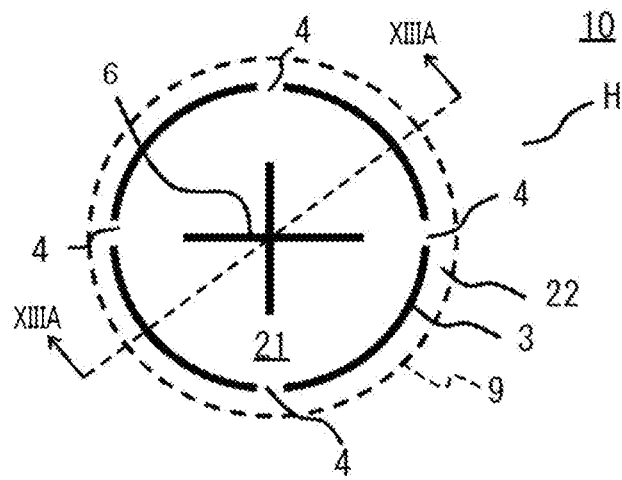
{Fig. 12B}
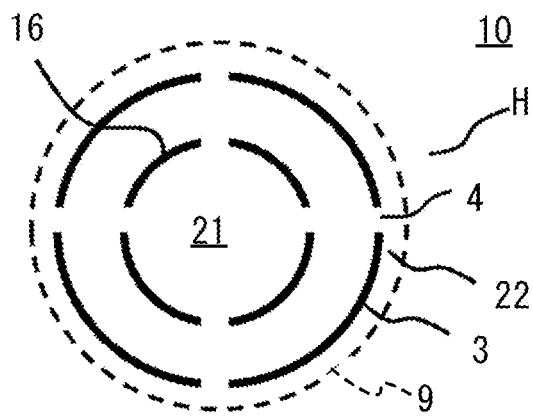
{Fig. 12C}
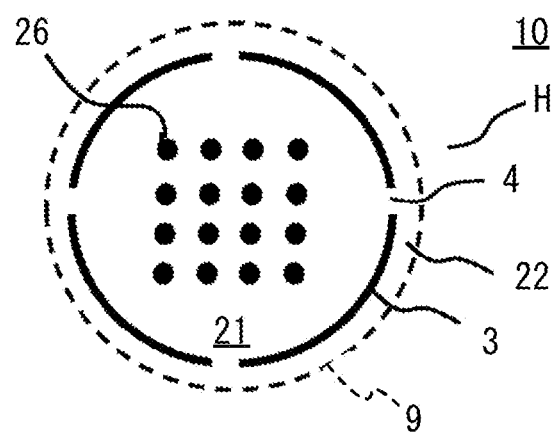

{Fig. 13A}
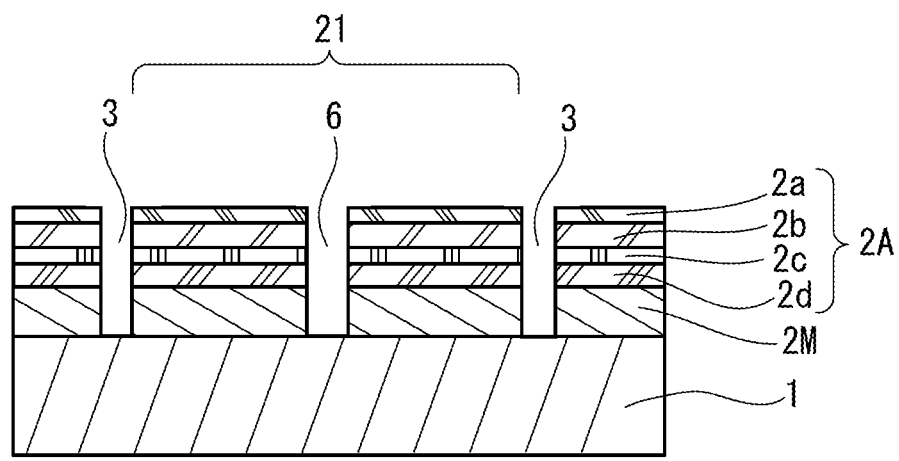
{Fig. 13B}
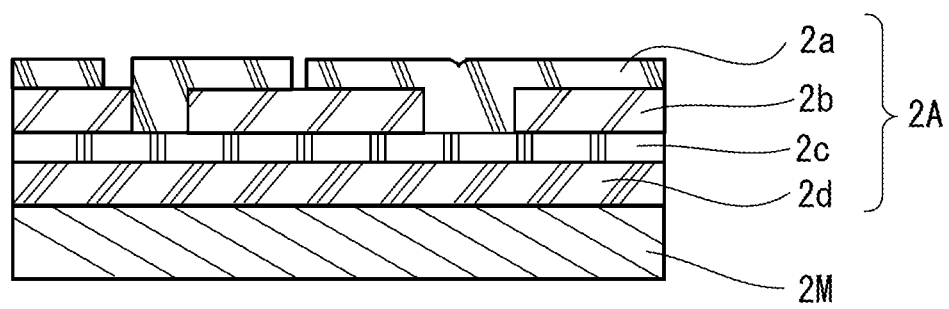

{Fig. 14A}
| NAME | REFERENCE SIGN | | MATERIAL | THICKNESS (nm) |
|---|---|---|---|---|
| OPTICAL MULTILAYER FILM | 2A | 2a | Ti | 10 |
| | | 2b | $SiO_2$ | 90 |
| | | 2c | Ti | 10 |
| | | 2d | $Al_2O_3$ | 80 |
| FIRST METAL FILM | 2M | | Ni | 300 |
| SUBSTRATE | 1 | | $Al_2O_3$ | --- |
{Fig. 14B}
| NAME | REFERENCE SIGN | | MATERIAL | THICKNESS (nm) |
|---|---|---|---|---|
| OPTICAL MULTILAYER FILM | 2A | 2a | Ti | 10 |
| | | 2b | $SiO_2$ | 60 |
| | | 2c | $TiO_2$ | 30 |
| | | 2d | $Al_2O_3$ | 60 |
| FIRST METAL FILM | 2M | | Al | 300 |
| SUBSTRATE | 1 | | $Al_2O_3$ | --- |
{Fig. 15}
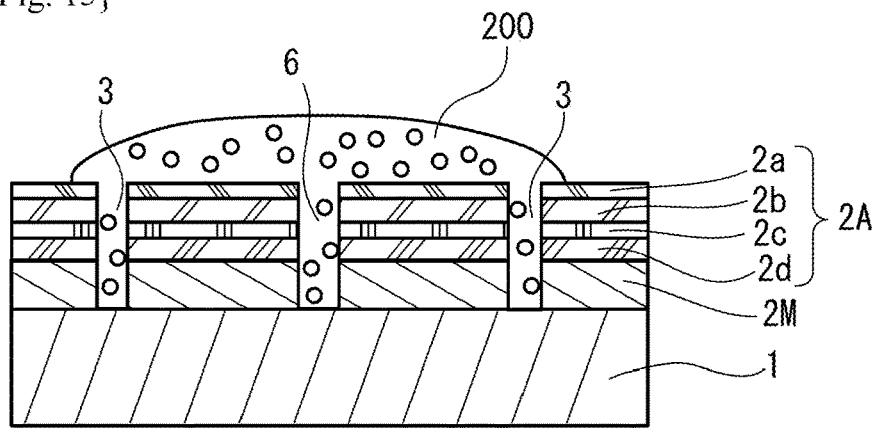

SAMPLE MOUNTING PLATE AND METHOD FOR MANUFACTURING THE SAME

TECHNICAL FIELD

The present invention relates to a sample mounting plate that mounts a sample thereon and a method for manufacturing the same.

BACKGROUND ART

As one ionization process in mass spectrometry capable of speedily and accurately diagnosing pathogenic germs and bacteria, matrix assisted laser desorption/ionization (MALDI) process is known.

The MALDI process is a process of ionizing a sample by mixing a sample in advance in a material (hereinafter called "matrix") that is likely to absorb laser light and to be ionized and irradiating a resultant mixture with laser light, in order to analyze an analyte that is less likely to absorb laser light or is susceptible to damage by laser light.

In a mass spectrometer utilizing the MALDI process, generally, a plate made of metal (hereinafter, called a "sample mounting plate") called a target plate on which a matter obtained by mixing an analyte and a matrix in advance and liquefying the mixture by a solvent (hereinafter, the matter is called a "sample", and a matter that is liquid at the time of dripping and is dried to be crystallized is also called a "sample") is mounted is placed in the spectrometer, and the sample mounted on the sample mounting plate is irradiated with laser light for a predetermined time to desorb and ionize the analyte. In this event, voltage is applied to the sample mounting plate made of metal to place the desorbed/ionized analyte in an electric field, thereby making the desorbed/ionized analyte easily fly toward an electrode for acceleration.

The sample mounting plate has a plurality of sample mounting regions (hereinafter, called "sample mounting spots") for mounting the sample thereon, and the sample mounting plate is placed in the mass spectrometer after a plurality of samples to be measured are respectively dripped to predetermined sample mounting spots and dried (crystallized), and the plurality of samples are irradiated with laser by moving the sample mounting plate.

In the MALDI process, it is important that the crystals deposit as uniformly as possible in the sample mounting spots, the analytes are appropriately desorbed/ionized, and appropriately ionized and accelerated without charge-up of the sample, and many suggestions regarding these analysis techniques have been made.

Regarding improvement of crystallization of a sample at a sample mounting spot and ionization of an analyte, for example, suggestion disclosed in PTL1 is that a sample mounting spot includes a central portion having an electrically conductive surface and a margin (peripheral) portion made of a hydrophobic mask such that the sample dripped onto the sample mounting spot crystallizes and deposits in a ring shape on the hydrophobic margin portion due to halo effect. The crystal ring formed at the margin portion is efficiently irradiated with laser light and thereby ionized.

Besides, suggestion disclosed in PTL2 is that a plurality of recessed parts each in a circular shape in a top view and called a well are provided on a sample mounting plate made of metal so that a dripped sample is dried and crystals are deposited in the recessed part. Then, preliminary measurement of the deposited sample unevenly existing in the recessed part is performed to find an irradiation site and to perform efficient ionization.

Besides, suggestion disclosed in PTL3 is that a conductive interference layer is provided on a substrate having an insulation property so as to exhibit a color different from that of the substrate, a hydrophobic layer is formed on a surface thereof, a groove forming a sample mounting spot is provided to expose the substrate, and the dripped sample is retained in the sample mounting spot (hereinafter, called an "anchoring effect") and crystallized and ionized.

CITATION LIST

Patent Literature

{PTL1} Japanese Unexamined Patent Application Publication (Translation of PCT Application) No. 2006-525525
{PTL2} Japanese Unexamined Patent Application Publication No. 2012-230801
{PTL3} WO 2015/019861

SUMMARY OF INVENTION

Technical Problem

However, in the conventional art disclosed in PTL1, efficient measurement is performed by irradiating the crystal ring of the sample formed on the margin portion of the sample mounting spot with laser light, but the margin portion is insulative in contrast to the central portion having an electrical conduction property and therefore is not sufficient in conductivity, so that the sample is charged up, bringing about a problem of interference with appropriate ionization.

Besides, a problem of the conventional art disclosed in PTL2 is that a sample mounting spot provided on the sample mounting plate made of metal is the same metal surface both on the inside and the outside of the recessed part, and therefore the anchoring effect of retaining the dripped sample inside the recessed part is low. Another problem is that the crystallized sample is generally white, which is low in contrast from a metallic color and poor in the visibility of the sample. Further, prevention of charge-up is not particularly considered in PTL2.

Besides, in the conventional art disclosed in PTL3, there is an anchoring effect of retaining the sample inside the spot due to the effect of the groove and the visibility of the sample is excellent because the color of the substrate is different from that of the sample, but a hydrophobic film or a transparent layer of a conductive interference layer formed thereunder is an insulating film and therefore is not sufficient in conductivity, so that the sample is charged up, bringing about a problem of interference with appropriate ionization.

The present invention has been made in consideration of the above points and its object is to enable appropriate ionization without charge-up of a sample

Solution to Problem

To solve the above problem, a sample mounting plate of this invention is a sample mounting plate including one or more sample mounting spots for mounting a sample thereon, the sample mounting plate including: a substrate having a conductive surface; and an insulating film that is layered on the conductive surface of the substrate, at least a surface of the insulating film being insulative, wherein the insulating film is sparsely formed so that the conductive surface of the substrate is partially exposed at least in the sample mounting spots.

In the sample mounting plate, it is preferable that the conductive surface of the substrate exposed in the surface of the insulating film in the sample mounting spots constitutes an electrode for placing the sample in an electric field.

Further, it is preferable that the conductive surface of the substrate is formed to be a rough surface.

Further, it is preferable that the substrate includes an insulative base and a conductive film formed on a surface of the base and forming the conductive surface.

Further, it is preferable that a surface of the sample mounting plate is hydrophobic outside the sample mounting spots.

Further, it is preferable that a hydrophobic film having hydrophobicity higher than that of the insulating film is formed at least in a region outside the sample mounting spots on the surface of the insulating film.

Further, it is preferable that the insulating film is an optical multilayer film.

Further, it is preferable that the optical multilayer film has at least two or more layers of a dielectric film or a metal film formed to be layered, and exhibits a color different from the sample in a wavelength region of visible light.

Further, in each of the above sample mounting plate, it is preferable that an exposed part that is located in a layer lower than an uppermost surface of the sample mounting spot and where a face having higher hydrophilicity than that of the uppermost surface is exposed, is provided at least at a center of the sample mounting spot or near the center in the sample mounting spot.

Further, it is preferable that the substrate includes an insulative base and a conductive film formed on a surface of the base and forming the conductive surface, and the face having higher hydrophilicity than that of the uppermost surface is the surface of the base.

Alternatively, it is preferable that the substrate includes an insulative base and a conductive film formed on a surface of the base and forming the conductive surface, and the face having higher hydrophilicity than that of the uppermost surface is a surface of the conductive film.

Further, in each of the above sample mounting plate, it is preferable that the base is made of ceramics.

Further, it is preferable that a connection part is provided in the exposed part, and the conductive surface in the sample mounting spot and the conductive surface outside the sample mounting spot are electrically conducted at least a part without being completely cut off by the exposed part.

Further, it is preferable that the exposed part and the insulating film have a difference in color to be clearly discriminated from each other.

Further, a method for manufacturing a sample mounting plate of this invention is a method for manufacturing a sample mounting plate having: an insulating film formed on a substrate having a conductive surface, at least a surface of the insulating film being insulative; and one or more sample mounting spots for mounting a sample thereon, the method including: a surface processing process of forming the conductive surface being a rough surface on the substrate; and an insulating film forming process of forming the insulating film, at least a surface of the insulating film being insulative, on the conductive surface of the substrate, wherein the insulating film forming process is a process of sparsely forming the insulating film at least on the conductive surface of the substrate corresponding to the sample mounting spots to partially expose the conductive surface of the substrate.

In the method for manufacturing the sample mounting plate sample mounting plate, it is preferable that: the substrate includes an insulative base and a conductive film formed on a surface of the base; and the surface processing process is a process of processing the surface of the base into a rough surface and then forming the conductive film on the base.

Alternatively, it is preferable that the substrate includes an insulative base and a conductive film formed on a surface of the base; and the surface processing process is a process of forming the conductive film on the base, and then processing the conductive film into a rough surface.

Further, in each of the above methods for manufacturing the sample mounting plate sample mounting plate, it is preferable that the method includes a hydrophobic film forming process of forming a hydrophobic film at least in a region outside the sample mounting spots on the insulating film, after the insulating film forming process.

Advantageous Effects of Invention

According to the present invention, a sample mounting plate and a manufacturing method of the same enabling appropriate ionization of a sample without charge-up by giving conductivity to the surface of the sample mounting spot, can be provided.

BRIEF DESCRIPTION OF DRAWINGS

FIG. 1A is a plan view illustrating a first embodiment of a sample mounting plate of the present invention.

FIG. 1B is an enlarged view of a portion indicated by a sign H in FIG. 1A.

FIG. 2 is a partial cross-sectional view taken along a section line II-II in FIG. 1B.

FIG. 3A is a diagram illustrating a configuration example of a first metal film and an optical multilayer film layered in FIG. 2.

FIG. 3B is a diagram illustrating another configuration example of the same.

FIG. 4 is a schematic partial cross-sectional view for explaining a state where the first metal film is exposed in a surface of the optical multilayer film in the sample mounting plate of FIG. 2.

FIG. 5A is a schematic cross-sectional view for explaining a coloring principle by interference in the optical multilayer film.

FIG. 5B is a view for explaining contrast between the sample mounting plate and a sample.

FIG. 6A is a partial cross-sectional view for explaining a state where a sample is mounted on a sample mounting spot in FIG. 2.

FIG. 6B is a schematic view for explaining an operation of a mass spectrometer.

FIG. 7 is a partial cross-sectional view of a sample mounting plate according to a second embodiment of the present invention, corresponding to FIG. 6A.

FIG. 8 is a partial cross-sectional view of a sample mounting plate according to a third embodiment of the present invention, corresponding to FIG. 6A.

FIG. 9 is a process chart for explaining a manufacturing method for manufacturing the sample mounting plate of the second embodiment, the method being according to the first embodiment of the manufacturing method of the present invention.

FIG. 10 is a process chart for explaining a manufacturing method for manufacturing the sample mounting plate of the second embodiment, the method being according to the second embodiment of the manufacturing method of the present invention.

FIG. 11 is a plan view illustrating a fourth embodiment of a sample mounting plate of the present invention, corresponding to FIG. 1.

FIG. 12A is an enlarged view of a portion indicated by a sign H in FIG. 11.

FIG. 12B is an enlarged view illustrating another configuration example of a portion indicated by a sign H in FIG. 11.

FIG. 12C is an enlarged view illustrating still another configuration example of a portion indicated by a sign H in FIG. 11.

FIG. 13A is a partial cross-sectional view taken along a section line XIIIA-XIIIA in FIG. 12A.

FIG. 13B is a diagram illustrating a configuration example of an optical multilayer film different from that shown in FIG. 13A.

FIG. 14A is a diagram illustrating a configuration example of a first metal film and an optical multilayer film layered in FIG. 13A.

FIG. 14B is a diagram illustrating another configuration example of the same.

FIG. 15 is a partial cross-sectional view for explaining a state where a sample is mounted on a sample mounting spot in FIG. 13A.

DESCRIPTION OF EMBODIMENTS

Hereinafter, the present invention will be described based on the drawings. However, the embodiments described below exemplify a sample mounting plate and a manufacturing method thereof for embodying the spirit of the present invention, and the present invention is not limited to the methods and configurations described below. The manufacturing methods, the shapes, materials, relative arrangement and so on of members described in the embodiments are not intended to limit the scope of the present invention only to them but are merely explanatory examples unless otherwise specifically stated. Further, the shapes and positional relation of members, in particular, the surface roughness and film layers to be formed illustrated in the drawings may be sometimes exaggerated for easy explanation. Further, in the description of the embodiments, the same number is given to the same component and overlapped description is omitted. Further, portions unrelated to the invention are omitted.

Description of First Embodiment of Sample Mounting Plate: FIG. 1A to FIG. 6B

First of all, a sample mounting plate 100 being a first embodiment of the sample mounting plate according to the present invention will be described using FIG. 1A to FIG. 6B. FIG. 1A is a plan view for explaining the configuration of the sample mounting plate 100, and FIG. 1B is an enlarged view of a portion indicated by a sign H near a sample mounting spot 10 of the sample mounting plate 100 in FIG. 1A. FIG. 2 is a cross-sectional view taken along a line II-II, illustrating a structure near the sample mounting spot in FIG. 1B. FIG. 3A and FIG. 3B are charts (tables) illustrating configuration examples of a substrate and a first metal film and an optical multilayer film to be layered in FIG. 2. FIG. 4 is a schematic enlarged cross-sectional view for explaining a state where a first metal film is sparsely exposed in the surface of the optical multilayer film. FIG. 5A is a schematic cross-sectional view for explaining the coloring principle by interference of the optical multilayer film, and FIG. 5B is a graph for explaining contrast between a sample and the sample mounting plate. FIG. 6A is a partial cross-sectional view for explaining a state where a sample is mounted on the sample mounting spot, and FIG. 6B is a schematic view for explaining operation of a mass spectrometer.

Description of Configuration of Sample Mounting Plate 100: FIG. 1A to FIG. 3B

First, the configuration of the sample mounting plate will be described using FIG. 1A and FIG. 1B. FIG. 1A is a plan view of the sample mounting plate viewed from a visual recognition face side, and FIG. 1B is an enlarged view of an H part of the sample mounting spot formed in the sample mounting plate.

A sample mounting plate described hereinafter is placed in a mass spectrometer utilizing MALDI process (see later-described FIG. 6B), and is used for mounting a sample on a sample mounting spot and analyzing the mass of analyte.

As shown in FIG. 1A, the substrate 100 is a nearly rectangular shaped flat plate having an outer shape is formed by a substrate of about 51 mm width×40 mm height×0.7 mm thick. The sample mounting plate 100 is produced using an insulating material such as $Al_2O_3$ (alumina) as a base material. Further, cutout parts utilized for, for example, positioning or the like of the sample mounting plate 100, are provided at corner portions of the near rectangle of the sample mounting plate 100. Further, the flatness of the sample mounting plate 100 has an accuracy of 30 μm or less. Note that the outer shape, thickness and so on are not particularly limited, but only need to match the specifications of the mass spectrometer.

The sample mounting plate 100 is formed with a plurality of almost circular sample mounting spots 10. In this example, longitudinally eight×laterally twelve, a total of 96 sample mounting spots are provided. The number of the sample mounting spots 10 is not limited to the above but is decided in conformity to the specification of the mass spectrometer, and, for example, in the case where the sample mounting plate is of a single-use (disposable) specification, the analysis cost per sample can be suppressed more as the mounting number is larger.

Note that column address marks 30 (for example, 1 to 9 and X to Z) and row address marks 40 (for example, A to H) which indicate positions of the sample mounting spots 10, and a serial number 50, a bar code 60 and so on for managing the sample mounting plate, are formed on the sample mounting plate 100. These address marks, serial number, bar code and so on are not limited to the above but may be added and deleted as necessary. Here, the methods for forming the sample mounting spot, address marks, serial number, and bar code are not particularly limited, but a processing method by laser marking is preferable.

Next, an enlarged view of the portion indicated by the sign H in FIG. 1A near the sample mounting spot 10 is illustrated in FIG. 1B. The sample mounting spot 10 is composed of grooves 3 formed in a ring shape formed intermittently along the inside of the outer shape of the spot, an island 21 inside the grooves 3, an outer peripheral part 22 (a region sandwiched between a broken line 9 and the grooves 3), and connecting parts 4 which connect the outer peripheral part 22 and the island 21. Here, positions where the connecting parts 4 are provided are four positions at every 90 degrees but, not limited to this, one or a plurality of connecting parts 4 may be formed at an arbitrary portion or positions. Further, the outside of the outer peripheral part 22 is a margin part 20 of the sample mounting plate.

Next, the configuration of the cross section of the sample mounting plate 100 will be described using FIG. 2. FIG. 2 is a cross-sectional view taken along a section line II-II passing through the center of the sample mounting spot 10 illustrated in FIG. 1B. A first metal film 2M is formed on the surface of a substrate 1 using an insulating material as a base material, and an optical multilayer film 2A is layered on the first metal film 2M. The optical multilayer film 2A is provided, for example, for adding a predetermined color to the surface of the substrate 1. The optical multilayer film 2A has an insulative surface, and is composed of a film of three layers 2c, 2b, 2a in this example though not particularly limited in kind of film and in the number of layers (details of the first metal film 2M and the optical multilayer film 2A will be described later).

Further, the sample mounting spot 10 includes the grooves 3 as described above, and the grooves 3 are constituted by a level difference between the first metal film 2M and the optical multilayer film 2A, and, an exposed part of the substrate 1 where the first metal film 2M and the optical multilayer film 2A are not formed. Here, the optical multilayer film 2A is sparsely formed on the first metal film 2M though not illustrated in FIG. 2, and is in a state where the first metal film 2M is partially exposed from gaps of the sparsely formed optical multilayer film 2A (details will be described later using FIG. 4). Note that the thickness of each film and the shape of the groove are indicated with exaggeration for easy explanation.

Next, examples of cross-sectional configuration of the sample mounting plate 100 will be described using FIG. 3A and FIG. 3B. FIG. 3A illustrates a configuration example of the substrate and the first metal film and the optical multilayer film to be layered shown by a reference sign J in FIG. 2, and illustrates one example of the cross-sectional configuration of the sample mounting plate 100. FIG. 3B illustrates another example thereof.

The cross-sectional configuration illustrated in FIG. 3A uses $Al_2O_3$ for the substrate 1. The thickness of the substrate 1 is about 0.7 mm although not shown. The first metal film 2M layered on the substrate 1 is made of Ni as a material and has a film thickness of about 300 nm. Next, a first layer 2c constituting the optical multilayer film 2A is made of $Al_2O_3$ and has a film thickness of about 80 nm. A second layer 2b is made of Ti and has a film thickness of about 10 nm. A third layer 2a is made of $SiO_2$ and has a film thickness of about 90 nm. The above configuration can make the surface of the sample mounting plate 100 exhibit a bluish color in a wavelength region of visible light. Since white $Al_2O_3$ is used for the substrate 1, excellent visibility of the sample mounting spot 10 can be realized due to contrast between the white of the substrate color exposed by the grooves 3 and the bluish color of the surface of the sample mounting plate.

Further, use of a material having high hydrophilicity such as $Al_2O_3$ for the base material of the substrate 1 and use of $SiO_2$ which is more hydrophobic than $Al_2O_3$ for the surface (uppermost layer) of the optical multilayer film 2A make it possible to enhance the anchoring effect of retaining the sample inside the spot when a liquid sample is dripped to the inside of the sample mounting spot 10.

Next, the cross-sectional configuration illustrated in FIG. 3B uses $Al_2O_3$ for the substrate 1. The first metal film 2M layered on the substrate 1 is made of Al as a material and has a film thickness of about 300 nm. Next, a first layer 2c constituting the optical multilayer film 2A is made of $Al_2O_3$ and has a film thickness of about 60 nm. A second layer 2b is made of $TiO_2$ and has a film thickness of about 30 nm. A third layer 2a is made of $SiO_2$ and has a film thickness of about 60 nm. The above configuration can make the surface of the sample mounting plate 100 exhibit a color different from the case of FIG. 3A in a wavelength region of visible light.

As described above, a suitable combination of the first metal film 2M and the optical multilayer film 2A formed to be layered on the substrate 1 can achieve arbitrary reflection characteristics (coloring) utilizing the optical interference. Note that the optical multilayer film 2A may be a combination of a dielectric film or dielectric films and a metal film or metal films as shown in FIG. 3A, or a combination of dielectric films only as shown in FIG. 3B.

Description of State where First Metal Film is Exposed in Optical Multilayer Film: FIG. 4

Next, the state where the optical multilayer film 2A layered on the substrate 1 is sparsely formed and the first metal film 2M is exposed in gaps of the sparsely formed optical multilayer film 2A will be described in detail using FIG. 4. FIG. 4 is a schematically enlarged cross-sectional view of a part of the cross section of the sample mounting plate 100 illustrated in FIG. 2, and illustrating the surface state with exaggeration for easy explanation.

The substrate 1 is constituted using a ceramic material such as $Al_2O_3$ as a base material. The substrate 1 is made by surface roughening the ceramic material being the base material, for example, by lapping to make the surface a rough surface having asperities of a predetermined size. In this first embodiment, an arithmetic mean roughness Ra of the surface of the substrate 1 is set to 0.3 µm or more to define the size of the asperities. On the surface of the substrate 1, the first metal film 2M is formed, for example, by vacuum deposition. At this time, the first metal film 2M is not uniformly deposited on the surface of the substrate 1 due to the asperities on the surface of the substrate 1 being the rough surface, but the first metal film 2M can completely cover the surface of the substrate 1 by setting the film thickness thereof largely (300 nm in this example).

On the first metal film 2M, the optical multilayer film 2A (2c, 2b, 2a) is formed. Here, by setting the total thickness of the optical multilayer film 2A relatively small ($2c=64$ nm, $2b=8$ nm, $2a=68$ nm in the example), a state where the optical multilayer film 2A does not fully cover the surface of the first metal film 2M but is sparsely formed is realized, namely, a state where the first metal film 2M is exposed from the gaps of the sparsely formed optical multilayer film 2A (see arrows 2M in FIG. 4) is realized.

Note that in the forming process of the optical multilayer film 2A by vacuum deposition or the like as illustrated in FIG. 4, applying particles of the optical multilayer film 2A (2c, 2b, 2a) from an oblique direction (see broken arrows 2A in FIG. 4) enables to easily create the gaps of the optical multilayer film 2A at shadow portions behind protruding portions.

Description Related to Coloring and Visibility of Sample Mounting Plate: FIG. 5A, FIG. 5B Next, the coloring and the visibility of the sample mounting plate will be described using FIG. 5A and FIG. 5B. FIG.

5A is a schematic cross-sectional view for explaining the interference of light in the case where the optical multilayer film 2A is formed on the substrate 1. FIG. 5B is a graph illustrating reflection characteristics of the sample mounting plate 100 colored by the optical multilayer film 2A and comparing the visibility (easiness to view) of the sample with the cases of other sample mounting plates made of metal.

In FIG. 5A, on the substrate 1, for example, the dielectric films 2a, 2b, 2c, 2d are formed to be layered as the optical multilayer film for description. Though arbitrary reflection characteristics (coloring) can be obtained by adjusting the material (refractive index) and thickness of each layer, and the number of layers, only a principle description will be made here using the schematic view. (It is generally supposed that a dielectric film having a high refractive index and a dielectric film having a low refractive index as a pair are alternately layered in a thickness of ¼ wavelength, thereby additively overlapping reflected waves from the interfaces of the layers due to the interference of light to achieve the reflection function with high efficiency).

Incident light P incident on the optical multilayer film 2A from an air layer 90 first generates a reflected wave 2aR at the interface between the air and the dielectric film 2a. Similarly, reflected waves 2bR, 2cR, 2dR, 1R are generated at the interfaces between the layers respectively. The reflections from the interfaces are added together into a reflected wave R. The reflected wave R having arbitrary reflection characteristics (coloring) can be obtained by changing the materials (refractive indexes) and film thicknesses of each film layer, and the number of film layers. Note that by providing a metal film in the dielectric film, various reflection characteristics can be achieved. In this example, metal films are adopted as the lowermost layer 2d and the intermediate layer 2b.

Next, in the graph of FIG. 5B, the vertical axis represents reflectance, and the horizontal axis represents wavelength. The reference sign R1 indicates the reflection characteristics of the sample mounting plate 100 and is depicted with a thick solid line in the drawing. The reflection characteristics R1 of the sample mounting plate 100 are that the reflectance as a whole is rather low in a wavelength region W (about 380 nm to about 780 nm) of the visible light but there is a peak of reflecting rather much light on a side of short wavelength, namely, bluish light, resulting in that the surface of the plate appears in blue color.

The reference sign Rs indicates the reflection characteristics of the dried sample and is depicted with a thick broken line in the drawing. The reflection characteristics Rs of the sample are almost flat and indicate high reflection characteristics (white) in a wavelength region W of visible light. Comparing the reflection characteristics of Rs and R1 in the wavelength region W of visible light, the difference in reflectance between the peak of the reflection characteristics R1 of the sample mounting plate and a low portion of the reflection characteristics Rs of the sample is C1 (contrast).

Besides, the reference sign R2 indicates reflection characteristics in the case where the sample mounting plate is a metal plate Ti (titanium), and the reference sign R3 indicates reflection characteristics in the case where the sample mounting plate is a metal plate SUS (stainless steel). The difference between Rs and R2 in the same wavelength region as above is C2 (contrast), and the difference between Rs and R3 is C3 (contrast). The relation among the contrasts C1 to C3 is C1>C2>C3, and C1 is the highest. This indicates that the sample mounted on the sample mounting plate 100 in this example can be viewed most easily. Further, the sample mounting spot 10 and various marks formed on the sample mounting plate 100 can be similarly viewed easily due to the contrast with the white color of the base material.

Description of Spectrometry Operation by Mass Spectrometer: FIG. 6A and FIG. 6B

Next, the operation of performing mass spectrometry of the sample will be described using FIG. 6A and FIG. 6B. Here, the sample mounting plate and a portion relating to ionization of the sample will be mainly described, and only a principle description for the others will be made with details omitted. FIG. 6A is a schematic view illustrating a state where a sample 200 is mounted on the above-described sample mounting plate 100, and FIG. 6B is a schematic view illustrating a state where the sample mounting plate on which the sample is mounted is placed in a mass spectrometer 300.

FIG. 6A illustrates a state where the sample 200 mixed with a matrix and liquefied is dripped to the sample mounting spot and then dried up. A predetermined amount of the sample 200 is dripped to an island 21 (see FIG. 1, FIG. 2) of the sample mounting spot 10 by a not-illustrated instrument. The dripped sample 200 tends to radially spread because of the gravity and the surface tension. Since the surface of the island 21 is a surface having a certain level of hydrophilicity, in which the first metal film 2M is sparsely exposing in the optical multilayer film 2A, the sample 200 enters the groove 3 while radially spreading, and reaches the surface (exposed face) of the substrate 1. Since the substrate 1 made of ceramics having high hydrophilicity, the reached sample 200 wetly remains on the surface of the substrate 1 and is held by the substrate 1 (anchoring effect).

Then, after completing the mounting of the sample 200 to be analyzed, each sample is dried up in that state. In this event, the sample mounting spot 10 on the sample mounting plate 100 exhibits strong anchoring effect for retaining the sample 200 in the spot and is therefore less likely to cause movement of the sample 200 even if it is vibrated, thus enabling stable dripping work.

Next, FIG. 6B illustrates a schematic view of a mass spectrometer 300 in which the sample mounting plate 100 with the sample 200 mounted thereon is placed in the mass spectrometer 300 and fixed by a not-illustrated fixing unit. Though the mass spectrometer has a mechanism in which the samples 200 mounted on a plurality of spots can move in an X-direction and a Y-direction and the samples can stop at a predetermined position, one sample mounting spot will be described here for simplification.

In the mass spectrometer 300 illustrated in FIG. 6B, the sample mounting plate 100 is placed on the left side and is detachably fixed by a not-illustrated clamp unit. Further, conduction can be performed from a not-illustrated voltage application unit to the sample mounting plate 100 and the first metal film 2M. The mass spectrometer 300 further includes a laser light source 220 which irradiates the sample 200 with laser light 220a, an ion accelerator 230 which accelerates samples (200a, 200b, 200c) having been separated from the sample 200 because of the irradiation of the laser light and having been ionized, an ion trap 231 which traps ions, a mass separator 232 which forms a flight space for ions and carries out mass separation of the ions, and an ion detector 240 which detects the mass-separated and reached ions on a time series basis.

Here, the polarity of the ion of the sample being a measuring object is assumed to be positive (positive potential). Upon start of the mass spectrometry, the laser light 220a is emitted from the laser light source 220 to the sample 200 being a measuring object for a predetermined time. Concurrently, a positive voltage V1 is applied from the not-illustrated voltage application unit to the first metal film 2M of the sample mounting plate 100. Since the sample mounting spots 10 have a surface where the first metal film 2M is exposed in the gaps of the sparsely formed optical multilayer film 2A, the positive voltage V1 is effectively applied to the sample 200. Concurrently, a negative voltage V2 is applied to a first grid of the ion trap 231.

In this event, the matrix included in the sample 200 evaporates together with a component of the sample, whereby the component of the sample is ionized. Then, since an electric field in a downward gradient is formed toward the ion trap 231 to which the negative voltage V2 is applied, the ion to which the positive voltage V1 is applied is accelerated in the ion accelerator 230 toward the ion trap 231. Thus, the desorbed and ionized analyte is sent into the mass separator (flight space) 232 through the ion trap 231, and reaches the ion detector 240 in the order of 200c, 200b, 200a because they are separated during flight depending on difference in mass and thus time difference occurs. The data detected by the ion detector 240 is then analyzed by a not-illustrated analyzer and subjected to mass spectrometry regarding the sample 200. As a result of this, the identification of the sample is speedily and accurately performed.

Effects of First Embodiment

As described above, according to the first embodiment, the following effects can be achieved.

The sample mounting plate 100 of the first embodiment is the sample mounting plate used for the mass spectrometry by the MALDI process, including: the substrate 1 having the insulation property and formed with the rough surface; and the first metal film 2M and the optical multilayer film 2A formed on the surface, wherein the optical multilayer film 2A is sparsely formed on the surface of the first metal film 2M, and the surface in the state where the first metal film 2M is exposed in the gaps of the sparsely formed optical multilayer film 2A is formed. In this case, the first metal film 2M corresponds to a conductive film constituting a conductive surface of the substrate 1, and the optical multilayer film 2A having an insulative surface corresponds to an insulating film.

With the above structure, the surface where the first metal film 2M is exposed functions as an electrode, so that when sample component is ionized at irradiation of laser light in mass spectrometry, the voltage applied to the sample mounting plate 100 can effectively place the ions in an electric field via the surface where the first metal film 2M is exposed. As a result of this, appropriate ionization becomes possible without charge-up of the sample, thus enabling mass spectrometry in high accuracy.

Further, use of the material having high hydrophilicity such as ceramics for the substrate 1 can enhance the anchoring effect for the sample by the grooves 3 of the sample mounting spot 10 where the base material of the substrate 1 is exposed. As a result of this, it becomes possible to improve the accuracy of the dripping position of the sample and improve the efficiency of the dripping work. Further, if made of the ceramic material, the substrate 1 having high planarity can be obtained at a relatively low cost. Adopting the substrate 1 having high planarity for the sample mounting plate 100 enables mass spectrometry in high accuracy.

Further, the first metal film 2M and the optical multilayer film 2A layered on the substrate 1 can produce an arbitrary color. As a result of this, the visibility of the sample to be mounted can be increased, thereby improving efficiency of the dripping work of the sample. Further, since visibility of the sample mounting spot 10 and various marks to be formed can be enhanced, thereby facilitating the work management for the sample. Further, creating sample mounting plates in various colors and color-coding them facilitate storage and management of samples.

Note that the example of using $Al_2O_3$ being ceramics for the substrate 1 is described in the example but, not limited to this, other ceramic materials, a composite material of porcelain and ceramics, glass, Si, plastic, and so on may be used. Further, the example of using Ni, Ti, Al as the first metal film 2M is described but, not limited to this, other metals such as chromium, gold may be used. Further, the example of using $Al_2O_3$, $TiO_2$, $SiO_2$ as the materials of the dielectric films is described but, not limited to this, other dielectric materials such as MgO, $MgF_2$, $ZrO_2$ may be used.

The formation of the rough surface on the substrate 1 by lapping is explained as the condition to expose the first metal film 2M in the gaps of the optical multilayer film 2A but, not limited to this, other processing methods such as polishing may be used. Further, the rough surface having an Ra of 0.3 μm or more is formed but, not limited to this, a rough surface having an Ra of 0.3 μm or less may be formed.

Further, the sample mounting plate used for the mass spectrometry by the MALDI process has been described as an example here, but the same effects can be achieved by adopting the same structure for sample mounting plates used for the mass spectrometry by other processes. For example, the present invention can be applied to sample mounting plates used for laser desorption/ionization process without using matrix (LDI), surface-assisted desorption/ionization process (SALDI), secondary ion mass spectroscopy process (SIMS), desorption electrospray ionization process (DESI), electrospray-assisted/laser desorption/ionization process (ELDI) and so on.

Description of Second and Third Embodiments of Sample Mounting Plate: FIG. 7 to FIG. 8

Next, a sample mounting plate 110 being a second embodiment of the sample mounting plate according to the present invention will be described using FIG. 7, and a sample mounting plate 120 being a third embodiment will be described using FIG. 8. FIG. 7 is a partial cross-sectional view of the sample mounting plate 110 of the second embodiment, and explanation thereof will be made in comparison with FIG. 6A of the first embodiment. Besides, FIG. 8 is a partial cross-sectional view of the sample mounting plate 120 of the third embodiment, and explanation thereof will be similarly made in comparison with FIG. 6A.

FIG. 7 and FIG. 8 illustrate partial cross-sectional views of the same sample mounting spot as that in FIG. 2.

The characteristic of the second embodiment is that a hydrophobic film 5 having hydrophobicity higher than that of the optical multilayer film is formed on the surface of the optical multilayer film outside the sample mounting spot 10.

The characteristic of the third embodiment is that a hydrophobic film 5 having hydrophobicity higher than that of the optical multilayer film is formed on the surface of the optical multilayer film both outside the sample mounting spot 10 and at the island part.

Both of them are for the purpose of enhancing the anchoring effect for the sample and the other configurations of the sample mounting plates are basically the same, and therefore the same number or the same sign is given to the same component for explanation to omit overlapped description.

First, in FIG. 7, in the sample mounting plate 110, the hydrophobic film 5 having hydrophobicity higher than that of the optical multilayer film 2A is formed on the surface outside the sample mounting spot 10 (on the optical multilayer film 2A). On the other hand, the hydrophobic film 5 is not formed at the island part inside the sample mounting spot 10. With such a configuration, the inside of the spot is hydrophilic and the outside of the spot is hydrophobic. Thus, the sample uniformly remains inside the spot and does not spread to the outside of the spot. As a result of this, the anchoring effect of the spot is high, and the accuracy of mounting the sample can be improved.

Next, in FIG. 8, in the sample mounting plate 120, the hydrophobic film 5 is formed both on the surface outside the sample mounting spot 10 (on the optical multilayer film 2A) and on the surface of the island part. With such a configuration, both the inside and the outside of the spot are hydrophobic but the hydrophilicity of the surface of the substrate 1 exposed by the groove 3 is high, and therefore there is a sufficient anchoring effect for the sample and there is an effect of preventing the sample from spreading to the outside of the spot. Further, the hydrophobic film 5 inside the spot is sparsely formed so that the optical multilayer film 2A is exposed as in the same manner that the optical multilayer film 2A inside the spot is sparsely formed so that the first metal film 2M is exposed.

Here, the hydrophobic film 5 can be formed using a water-repellent agent containing C (carbon) or F (fluorine) or Si (silicon) by a vacuum deposition method or the like. Note that the film thickness of the hydrophobic film is, for example, as small as about 2 to 3 nm and thus less affects the conductivity of the surface inside the sample mounting spot 10.

The sample mounting plate 110 of the second embodiment and the sample mounting plate 120 of the third embodiment have many effects similarly to the sample mounting plate 100 of the first embodiment, but the effects are overlapped, and therefore the description thereof is omitted.

Description of Method for Manufacturing Sample Mounting Plate 110: FIG. 9 to FIG. 10

Next, a method for manufacturing the sample mounting plate 110 of the second embodiment will be described using FIG. 9 and FIG. 10. Note that about the methods for manufacturing the sample mounting plate 100 and the sample mounting plate 120, different points in the manufacturing methods will be described later.

FIG. 9 is a process chart illustrating a first manufacturing method of the sample mounting plate 110. FIG. 10 is a process chart illustrating a second manufacturing method of the sample mounting plate 110.

The characteristic of the first manufacturing method is a manufacturing method in which a predetermined rough surface is first formed on a substrate and a first metal film and an optical multilayer film are formed to be layered on the rough surface, thereby realizing sparse forming of the optical multilayer film.

The characteristic of the second manufacturing method is a manufacturing method in which a first metal film is first formed on a substrate, a rough surface is formed on the surface of the first metal film, and then an optical multilayer film is formed to be layered, thereby realizing sparse forming of the optical multilayer film.

The other manufacturing processes of the two manufacturing methods are basically the same, and therefore the same number or the same sign is given to the same component for explanation to omit overlapped description.

Description of First Embodiment of Manufacturing Method: FIG. 9

As the first embodiment of the manufacturing method of the sample mounting plate of the present invention, main processes in S310 to S370 of the first manufacturing method of the sample mounting plate 110 are illustrated in FIG. 9 and explained. Note that general works such as transfer, inspection, cleaning, drying, annealing and so on necessary for each process are naturally performed unless otherwise specifically stated in each process, and description thereof will be omitted.

[Substrate Receiving Process: S310]

First, in a substrate receiving process S310, the flatness and the surface roughness of the substrate 1 are inspected to confirm that the substrate 1 has predetermined flatness and surface roughness.

[Substrate Surface Processing Process (Enlarged View): S320]

Next, in a substrate surface processing process S320, a surface roughing process is performed on the substrate 1. The substrate 1 is finished to have a predetermined surface roughness, for example, Ra of 0.3 μm or more, by, for example, a lapping process, a polishing process or the like. Note that main inspection items in this process are the surface roughness and the flatness of the substrate.

[First Metal Film Forming Process (Enlarged View): S330]

Next, in a first metal film forming process S330, the first metal film 2M is formed. For example, Ni is formed in a thickness of 300 nm using a deposition method such as vacuum deposition or sputtering. In this event, the irradiation direction of deposition particles is desirably a vertical direction in order to make a uniform film as much as possible (see the broken arrows 2M).

[Optical Multilayer Film Forming Process (Enlarged View): S340]

Next, in an optical multilayer film forming process S340, the optical multilayer film 2A is formed to be layered. For example, the 2c layer=$Al_2O_3$ in a thickness of 64 nm, the 2b layer=Ti in a thickness of 8 nm, and the 2a layer=$SiO_2$ in a thickness of 68 nm are formed in order by a deposition method such as vacuum deposition or sputtering. In this process, since the respective film layers of the optical multilayer film 2A are relatively thin, the optical multilayer film 2A is sparsely formed on the surface of the first metal film 2M and formed so that the first metal film 2M is exposed from the gaps of the optical multilayer film 2A (see a solid arrow 2M). In this event, it is desirable to apply deposition particles in an oblique direction in order to make it easy to sparsely form the optical multilayer film 2A (see broken arrows 2A). Note that a main inspection item in this process is conductivity of the surface.

[Hydrophobic Film Forming Process: S350]

Next, in a hydrophobic film forming process S350, the hydrophobic film 5 is formed to be layered on the surface of the optical multilayer film 2A formed in the preceding process. For example, a water-repellent agent containing C (carbon) or F (fluorine) or Si (silicon), or a water-repellent agent made by compounding them is formed into, for example, a thickness of 2 nm by a deposition method such as vacuum deposition. In this event, it is desirable to obliquely apply deposition particles s of the hydrophobic film 5 because of the same reason as that in the preceding process S340 (see broken arrows s). Note that the main inspection items in this process are wettability (hydrophobicity) and conductivity of the surface of the hydrophobic film.

[Groove Forming Process: S360]

Next, in a groove forming process S360, the groove 3 which forms the sample mounting spot 10 is formed. For example, a peeling process is performed by a processing method such as laser marking method, on the film layers to penetrate the hydrophobic film 5, the optical multilayer film 2A, and the first metal film 2M until the surface of the substrate 1 is exposed. Further, it is desirable to simultaneously form the other address mark, bar code and so on. Note that the main inspection item in this process is wettability (hydrophilicity) of the exposed surface of the substrate 1.

[Hydrophobic Film Removing Process: S370]

Finally, in a hydrophobic film removing process S370, the hydrophobic film 5 formed inside the sample mounting spot 10 is peeled. For example, a mask 7 (its detailed description will be omitted) is formed outside the sample mounting spots 10 and the hydrophobic film 5 is peeled by the processing method such as plasma etching. In this event, the conductivity of the surface of the sample mounting spot may be adjusted by adjusting the processing time and application angle of the plasma etching. Note that the main inspection item in this process is wettability (hydrophilicity) and conductivity of the surface of the sample mounting spot.

By the first manufacturing method described above, the optical multilayer film 2A is sparsely formed on the surface in the sample mounting spot 10, and the first metal film 2M is exposed from the gaps of the sparsely formed optical multilayer film 2A, so that the voltage applied to the sample mounting plate 110 can effectively place the sample in an electric field. As a result of this, it is possible to provide a manufacturing method of the sample mounting plate 110 capable of performing appropriate ionization without charge-up of the sample in the mass spectrometry. Further, it is possible to provide a method for manufacturing a sample mounting plate having a desired reflected color by the optical multilayer film on the surface of the substrate. Further, it is possible to provide a method for manufacturing a sample mounting plate excellent in visibility of a sample and exhibiting strong anchoring effect for a dripping sample.

Description of Second Embodiment of Manufacturing Method: FIG. 10

As the second embodiment of the manufacturing method of the sample mounting plate of the present invention, main processes in S410 to S470 of the second manufacturing method of the sample mounting plate 110 are illustrated in FIG. 10 and explained. The different points of the second manufacturing method from the first manufacturing method are that the first metal film 2M is first formed on the surface of the substrate 1 in a process S420 and a rough surface is formed on the surface of the first metal film 2M in a next process S430. Subsequent processes S440 to S470 are the same as processes S340 to S370 of the first manufacturing method. Accordingly, the same number or the same sign is given to the same component to omit overlapped description.

The manufacturing method of the sample mounting plate 110 has been described above, and the different points of the manufacturing methods of the sample mounting plate 100 and the sample mounting plate 120 will be described.

The different point of the manufacturing method of the sample mounting plate 100 from the first manufacturing method illustrated in FIG. 9 is that the hydrophobic film forming process S350 is omitted (similarly in the second manufacturing method).

The different point of the manufacturing method of the sample mounting plate 120 from the first manufacturing method illustrated in FIG. 9 is that the hydrophobic film removing process S370 is omitted (similarly in the second manufacturing method).

Description of Fourth Embodiment of Sample Mounting Plate: FIG. 11 to FIG. 14

Next, configuration of a sample mounting plate being a fourth embodiment of the sample mounting plate according to the present invention will be described using FIG. 11. FIG. 11 is a plan view of the sample mounting plate viewed from the side of the face for mounting the sample, corresponding to FIG. 1A.

The sample mounting plate 100 is almost in common with the example illustrated in FIG. 1A in material and shape of the substrate 1, and arrangement of sample mounting spots 10. However, the point that the flatness there of is an accuracy of 30 μm or less is different, and face finish by a lapping process or a polishing process may be performed in order to ensure the flatness. Besides, the sample mounting plate 100 is different from the example illustrated in FIG. 1 in films to be provided on the substrate 1 and details of the structure of the sample mounting spot, and these points will be described.

Next, enlarged views of a portion indicated by a sign H near a sample mounting spot 10 in FIG. 11 are illustrated in FIG. 12A to FIG. 12C. In this embodiment, three examples are illustrated in FIG. 12A, FIG. 12B, and FIG. 12C.

The first example will be described using FIG. 12A. The illustration of FIG. 11 corresponds to FIG. 12A.

The sample mounting spot 10 is a region surrounded by a spot outer edge 9, and the grooves 3 are formed in a ring shape at a portion near the spot outer edge 9 in the spot. In addition to this, an exposed part 6 where the face having high hydrophilicity is exposed is formed at a central portion inside the grooves 3 in the spot. In this example, the exposed part 6 in a crossed groove shape is formed so that the substrate is exposed to the surface. The grooves 3 are not a continuous closed curve but are formed with connecting parts 4 which connect the island 21 being an inner region surrounded by the grooves 3 to the outer peripheral part 22 and the margin part 20 (FIG. 11) of the sample mounting plate. As described above, the sample mounting spot 10 is a region including the grooves 3, the exposed part 6, the island 21, and the connecting parts 4, and is defined as a region including the outer peripheral part 22 (a region sandwiched between the spot outer edge 9 and the grooves 3) of the grooves 3. The outer peripheral part 22 is sufficiently separated from outer peripheral parts of adjacent sample mounting spots so that mounted samples will not be mixed or contaminated with one another.

The second example will be described using FIG. 12B.

The second example is the same in basic structure as the first example other than that an exposed part 16 in a ring shape made by dividing a ring into four parts is formed in place of the cross shaped exposed part 6 in the first example. The exposed part 16 is formed so that the substrate is exposed to the surface.

The third example will be described using FIG. 12C.

The third example is the same in basic structure as the first example other than that an exposed part 26 in a shape of a plurality of dots is formed in place of the cross shaped exposed part 6 in the first example. The exposed part 26 is formed so that the substrate is exposed to the surface.

The three examples have been illustrated as above, but the pattern of the exposed part to be formed in the sample mounting spot 10 is not limited to them but various patterns are conceivable. Further, in the examples, the surface having high hydrophilicity is exposed in the exposed part but, not limited to this, the metal film or the like having high hydrophilicity may be exposed.

Next, the cross-sectional configuration of the sample mounting plate 100 of the fourth embodiment will be described using FIG. 13A. FIG. 13A is a cross sectional view taken along a section line XIIIA-XIIIA passing through the center of the sample mounting spot 10 illustrated in FIG. 12A. Here, a first metal film 2M is formed first on the surface on one side of the substrate 1. Next, an optical multilayer film 2A is formed to be layered on the first metal film 2M. The optical multilayer film 2A is composed of a dielectric film or a second metal film, and not particularly limited in kinds of films and in the number of layers, and the optical multilayer film 2A has, for example, 2d, 2c, 2b, 2a formed in this order. The first metal film 2M and the optical multilayer film 2A are formed by a deposition method such as vacuum deposition or sputtering. Note that in the fourth embodiment, different from the case of the first embodiment, the (uppermost) surface of the optical multilayer film 2A is conductive (but not prevented from being insulative).

The reason why the (uppermost) surface of the optical multilayer film 2A is made to be conductive is to assist electrical conduction of the island 21. By making the (uppermost) surface of the optical multilayer film 2A conductive, the electrical conduction at the island 21 is established not only by the first metal film 2M but also by the conductive layer (the Ti layer in the later-described example) on the surface of the optical multilayer film 2A to surely secure the electrical conduction. Note that the conductive layer on the surface of the optical multilayer film 2A is desirably formed to be thin in film thickness. This is to maintain the color of the surface of the sample mounting plate 100.

Further, in the sample mounting spot 10, the grooves 3 and the exposed part 6 penetrate the first metal film 2M and the optical multilayer film 2A as described above to expose the surface of the substrate 1. Here, by adopting a material such as $Al_2O_3$ having higher hydrophilicity than that of the optical multilayer film 2A located on the uppermost surface of the sample mounting spot 10 for the substrate 1 exposed by the grooves 3, it is possible to enhance the anchoring effect of retaining the sample inside the spot when a liquid sample is dripped to the sample mounting spot 10 (see later-described FIG. 15).

The grooves 3 and the exposed part 6 are formed to expose the surface of the substrate 1 in the fourth embodiment but, not limited to this, the grooves 3 and the exposed part 6 can also be formed to penetrate only the optical multilayer film 2A so as to expose the surface of the first metal film 2M. Furthermore, it is also possible to expose the layer in the middle of the optical multilayer film, and the exposed surfaces only need to be hydrophilic. The method of forming the grooves 3 and the exposed part 6 may be a method by laser marking or a method by etching using photolithography. These methods are suitable, particularly, in forming the grooves 3 and the exposed part 6 while leaving a part of the optical multilayer film or the first metal film 2M, and the method is not limited.

Next, substrate cross-sectional configurations of the sample mounting plate 100 will be described using FIG. 14A and FIG. 14B.

FIG. 14A illustrates an example of the cross-sectional configuration of the sample mounting plate 100 of FIG. 13. The cross-sectional configuration illustrated in FIG. 14A uses $Al_2O_3$ for the substrate 1. The first metal film 2M layered on the substrate 1 is made of Ni as a material and has a film thickness of about 300 nm (1 nm=0.000001 mm). Next, a first layer 2d constituting the optical multilayer film 2A is made of $Al_2O_3$ and has a film thickness of about 80 nm. A second layer 2c is made of Ti and has a film thickness of about 10 nm. A third layer 2b is made of $SiO_2$ and has a film thickness of about 90 nm. A fourth layer 2a is made of Ti and has a film thickness of about 10 nm. The above configuration can make the surface of the sample mounting plate 100 exhibit navy blue in a wavelength region of visible light.

FIG. 14B illustrates another example of the cross-sectional configuration of the sample mounting plate 100 of FIG. 13. The cross-sectional configuration illustrated in FIG. 4B uses $Al_2O_3$ for the substrate 1. The first metal film 2M layered on the substrate 1 is made of Al as a material and has a film thickness of about 300 nm. Next, a first layer 2d constituting the optical multilayer film 2A is made of $Al_2O_3$ and has a film thickness of about 60 nm. A second layer 2c is made of $TiO_2$ and has a film thickness of about 30 nm. A third layer 2b is made of $SiO_2$ and has a film thickness of about 60 nm. A fourth layer 2a is made of Ti and has a film thickness of about 10 nm. The above film configuration can make the surface of the sample mounting plate 100 exhibit blue in a wavelength region of visible light.

As described above, a suitable combination of the first metal film 2M and the optical multilayer film 2A formed to be layered on the substrate 1 can achieve arbitrary reflection characteristics (coloring) utilizing the optical interference. Note that the optical multilayer film 2A may be configured not only of dielectric films but also a combination with a metal film or metal films as shown in FIG. 14A and FIG. 14B. Metal films are used for the intermediate layer 2c and the uppermost layer 2a in the example of FIG. 14A, whereas a metal film is used for the uppermost layer 2a in the example of FIG. 14B.

The principle that the optical multilayer film 2A is viewed to be colored is the same as that described using FIG. 5A in the first embodiment. As a result of selecting concrete film materials and film thicknesses as illustrated in FIG. 14A or FIG. 14B based on the principle, the reflection characteristics of the sample mounting plate 100 in the example of FIG. 14A are that the reflectance as a whole is rather low in a wavelength region W (about 380 nm to about 780 nm) of the visible light but there is a peak of reflecting rather much light on a side of short wavelength, namely, navy blue light, resulting in that the surface of the plate appears in navy blue color.

The reflection characteristics of the sample mounting plate 100 in the example of FIG. 14B are similar to the characteristics exhibited in the example of FIG. 14A but slightly different in that it appears in blue color.

Further, in the case of the structure where the layer 2b under the uppermost layer 2a is an insulating layer and the layer 2c thereunder is a conductive layer as illustrated in FIG. 14A, it is considered to sparsely form the insulating layer 2b (and the uppermost layer 2a) using the rough surface as described using FIG. 4 in the first embodiment (see FIG. 13B). FIG. 13B is a view illustrating the configuration of the case where the insulating layer 2b and the uppermost layer 2a are sparsely formed in the parts of the first metal film 2M and the optical multilayer film 2A in FIG. 13A.

When such a configuration is adopted, the uppermost layer 2a is formed to be inserted into the whole or part of the portions where the insulating layer 2b is not formed, so that the uppermost layer 2a comes into contact with the conductive layer 2c. Therefore, it is possible to allow the conductive layer 2c other than the uppermost layer 2a included in the optical multilayer film 2A to contribute to the electrical conduction of the island 21, thus making the electrical conduction at the island 21 surer.

Description of Spectrometry Operation by Mass Spectrometer: FIG. 15

Next, the operation of performing mass spectrometry of the sample will be described using FIG. 15. Here, the sample mounting plate and a portion relating to ionization of the sample will be mainly described, and only a principle description for the others will be made with details omitted. FIG. 15 illustrates a state where a sample 200 is mounted on the above-described sample mounting plate 100.

FIG. 15 illustrates a cross-section of a state where the sample 200 made by mixing an analyte and a matrix and liquefying the mixture by a solvent is dripped to the sample mounting spot, and then evaporated and dried up. A predetermined amount of the sample 200 is dripped to an island 21 (see FIG. 12A to FIG. 13A) of the sample mounting spot 10 by a not-illustrated instrument. The dripped sample 200 tends to radially spread because of the gravity and the surface tension. The sample 200 enters the groove 3 and the exposed part 6 while radially spreading, and reaches the surface (exposed face) of the substrate 1. Since the substrate 1 made of ceramics has a high hydrophilicity, the reached sample 200 wetly remains on the surface of the substrate 1 and is held by the substrate 1 (anchoring effect).

Then, after completion of the mounting of the sample 200 to be analyzed, each sample 200 is dried up in that state. In this event, since the exposed part 6 is formed near the center inside the outer peripheral part 22 of the sample mounting spot 10, that is, near the center of the island 21, the sample mounting spot 10 on the sample mounting plate 100 exhibits stronger anchoring effect for retaining the sample 200 near the center of the island 21 than the case where only the grooves 3 are formed, and is less likely to cause movement of the sample 200 even if it is vibrated, thus enabling stable holding at dripping to facilitate work.

The sample 200 on the above described sample mounting plate 100 can be analyzed similarly to the case of the first embodiment using the same mass spectrometer 300 as one described using FIG. 6B in the first embodiment. Note that a positive voltage V1 applied from the voltage application unit is applied not only to the first metal film 2M but also to the metal film (2a, 2c in the example of FIG. 14A, and 2a in the example of FIG. 14B) in the optical multilayer film of the sample mounting plate 100.

Effects of Fourth Embodiment

As described above, according to the fourth embodiment, the following effects can be achieved.

The sample mounting plate 100 of the fourth embodiment is the sample mounting plate used for the mass spectrometry by the MALDI process which includes at least one sample mounting spots 10 for mounting a sample thereon, characterized in that the grooves 3 and the exposed part 6 where the substrate is exposed are provided in the island 21 of the sample mounting spot 10, and that the substrate 1 exposed in the grooves 3 and the exposed part 6 has higher hydrophilicity than that of the surface (the uppermost layer of the optical multilayer film 2A) of the sample mounting plate, and that the substrate 1 is in a white color with a color difference at a degree of being clearly discriminated from the bluish color by the optical multilayer film 2A and is thus excellent in visibility.

This enables a worker to surely drip the sample 200 to the sample mounting spot 10 and enables the dripped sample 200 to be trapped at the exposed part 6 near the center inside the outer peripheral part 22 of the sample mounting spot 10 and to surely wetly spread in the island 21. As a result of this, the sample is surely mounted at the central portion of the sample mounting spot 10, thereby preventing a decrease in density of the sample to be mounted at the central portion. Since the connecting parts 4 are formed, the first metal film 2M in the sample mounting spot 10 and the first metal film 2M outside thereof are not completely cut off by the exposed part 6, thus securing the electrical conduction of the sample with the margin part 20 of the sample mounting plate 100.

Use of the material having high hydrophilicity such as ceramics for the substrate 1 can enhance the anchoring effect for the sample in the sample mounting spot 10. As a result of this, it becomes possible to improve the accuracy of the dripping position of the sample and improve the efficiency of the dripping work. Further, the variation in distance where the ionized sample is accelerated in the electric field is small because of high planarity of the substrate 1, thus enabling mass spectrometry with high measurement accuracy.

Further, the first metal film 2M and the optical multilayer film 2A layered on the substrate 1 can produce an arbitrary color. As a result of this, the visibility of the sample to be mounted can be increased, thereby improving the efficiency of the dripping work of the sample. Further, since the visibility of the sample mounting spot 10 can be further increased by the sample mounting spot 10 to be formed and the grooves 3 inside the sample mounting spot 10, thereby facilitating the work management for the sample. Further, creating sample mounting plates in various colors and color-coding them facilitates storage and management of samples.

Note that the materials of the substrate 1 and the dielectric film are not limited to those described herein as in the case of the first embodiment.

Further, forming the hydrophobic film on the optical multilayer film 2A to widen the difference in hydrophilicity from that of the exposed part of the substrate is expected to increase the effects of this embodiment. The hydrophobic film can be formed using a water-repellent agent containing C (carbon) or F (fluorine) or Si (silicon) by a vacuum deposition method or the like. The film thickness of the hydrophobic film may be, for example, as small as about 2 to 3 nm and thus less affects the conductivity of the surface inside the sample mounting spot 10. Further, the hydrophobic film may be selectively formed on the optical multilayer film 2A in a manner not to form the hydrophobic film in the sample mounting spot 10.

Besides, the first metal film 2M and the optical multilayer film 2A are formed on the substrate 1 in the fourth embodiment but, for example, another hydrophilic film or the like may be formed on the surface of the substrate 1, whereby the effect of increasing the visibility or the like is expected.

Further, though the first metal film 2M and the optical multilayer film 2A are formed only on the surface on one side of the substrate 1 in this fourth embodiment, it may be more convenient that the first metal film 2M and the optical multilayer film 2A are formed on the surfaces on both sides of the substrate 1 in some cases depending on the method for forming the films. The first metal film 2M and the optical multilayer film 2A may be formed on the surfaces on both sides of the substrate 1, or one of the first metal film 2M and the optical multilayer film 2A may be formed on the surface on the side where the sample is not mounted, or the first metal film 2M and the optical multilayer film 2A may be formed only on a portion of the surface on the one side of the substrate 1 in plane view.

The embodiments of the sample mounting plate and the method for manufacturing the same have been described in detail in the above, but the present invention is not limited to the embodiments and the manufacturing method, and the configurations of details, materials and numbers can be arbitrarily modified, added, deleted without departing from the spirit of the present invention. In other words, modifications and omissions may be made within the scope of the contents as set forth in claims of the above-described sample mounting plate and the manufacturing method. Further, the configurations described in the respective embodiments or the modifications thereof may be embodied by arbitrarily combining them as long as no discrepancy arises.

REFERENCE SIGNS LIST

1 . . . substrate
2A . . . optical multilayer film
2M . . . first metal film (exposed portion of first metal film)
2a, 2b, 2c, 2d . . . film
3 . . . groove
4 . . . connecting part
5 . . . hydrophobic film
6, 16, 26 . . . exposed part
7 . . . mask
10 . . . sample mounting spot
20 . . . margin part (of sample mounting plate)
21 . . . island (of sample mounting spot)
22 . . . outer peripheral part (of sample mounting spot)
30 . . . column address mark
40 . . . row address mark
50 . . . serial number
60 . . . bar code
90 . . . air layer
100, 110, 120 . . . sample mounting plate
200 . . . sample
200a, 200b, 200c . . . ionized sample
220 . . . laser light source
220a . . . laser light
230 . . . ion accelerator
231 . . . ion trap
232 . . . mass separator (flight space)
240 . . . ion detector
300 . . . MALDI mass spectrometer

The invention claimed is:

1. A sample mounting plate comprising one or more sample mounting spots for mounting a sample thereon, the sample mounting plate comprising:
a substrate having a conductive surface formed to be a rough surface; and an insulating film that is layered on the conductive surface of the substrate, at least a surface of the insulating film being insulative,
wherein the insulating film is formed so that gaps corresponding to protruding portions of the rough surface are formed in the insulating film and the conductive surface of the substrate is partially exposed through the gaps at least in the sample mounting spots.

2. The sample mounting plate according to claim 1, wherein the conductive surface of the substrate exposed in the surface of the insulating film in the sample mounting spots constitutes an electrode for placing the sample in an electric field.

3. The sample mounting plate according to claim 1, wherein the substrate comprises an insulative base and a conductive film formed on a surface of the base and forming the conductive surface.

4. The sample mounting plate according to claim 1, wherein a surface of the sample mounting plate is hydrophobic outside the sample mounting spots.

5. The sample mounting plate according to claim 4, wherein a hydrophobic film having hydrophobicity higher than that of the insulating film is formed at least in a region outside the sample mounting spots on the surface of the insulating film.

6. The sample mounting plate according to claim 1, wherein the insulating film is an optical multilayer film.

7. The sample mounting plate according to claim 6, wherein the optical multilayer film has at least two or more layers of a dielectric film or a metal film formed to be layered, and exhibits a color different from the sample in a wavelength region of visible light.

8. The sample mounting plate according to claim 1, wherein an exposed part that is located in a layer lower than an uppermost surface of the sample mounting spot and where a face having higher hydrophilicity than that of the uppermost surface is exposed, is provided at least at a center of the sample mounting spot or near the center in the sample mounting spot.

9. The sample mounting plate according to claim 8, wherein the substrate comprises an insulative base and a conductive film formed on a surface of the base and forming the conductive surface, and the face having higher hydrophilicity than that of the uppermost surface is the surface of the base.

10. The sample mounting plate according to claim 8, wherein the substrate comprises an insulative base and a conductive film formed on a surface of the base and forming the conductive surface, and the face having higher hydrophilicity than that of the uppermost surface is a surface of the conductive film.

11. The sample mounting plate according to claim 3, wherein the base is made of ceramics.

12. The sample mounting plate according to claim 8, wherein a connection part is provided in the exposed part, and the conductive surface in the sample mounting spot and the conductive surface outside the sample mounting spot are electrically conducted at least a part without being completely cut off by the exposed part.

13. The sample mounting plate according to claim 8, wherein the exposed part and the insulating film have a difference in color to be clearly discriminated from each other.

14. A method for manufacturing a sample mounting plate having:
an insulating film formed on a substrate having a conductive surface, at least a surface of the insulating film being insulative; and one or more sample mounting spots for mounting a sample thereon, the method comprising:
a surface processing process of forming the conductive surface being a rough surface on the substrate; and an insulating film forming process of forming the insulating film, at least a surface of the insulating film being insulative, on the conductive surface of the substrate, wherein the insulating film forming process is a process of forming the insulating film at least on the conductive surface of the substrate corresponding to the sample mounting spots with gaps corresponding to protruding portions of the rough surface to partially expose the conductive surface of the substrate through the gaps.

15. The method for manufacturing the sample mounting plate according to claim 14, wherein:
   the substrate comprises an insulative base and a conductive film formed on a surface of the base; and
   the surface processing process is a process of processing the surface of the base into a rough surface and then forming the conductive film on the base.

16. The method for manufacturing the sample mounting plate according to claim 14, wherein:
   the substrate comprises an insulative base and a conductive film formed on a surface of the base; and
   the surface processing process is a process of forming the conductive film on the base, and then processing the conductive film into a rough surface.

17. The method for manufacturing the sample mounting plate according to claim 14, further comprising:
   a hydrophobic film forming process of forming a hydrophobic film at least in a region outside the sample mounting spots on the insulating film, after the insulating film forming process.

* * * * *